US006608134B1

(12) United States Patent
Tobing et al.

(10) Patent No.: US 6,608,134 B1
(45) Date of Patent: Aug. 19, 2003

(54) ADHESIVES AND METHOD FOR MAKING SAME

(75) Inventors: Singa D. Tobing, Mentor, OH (US); Andrew Klein, Somerville, NJ (US); Thomas Edward White, Madison, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/565,718

(22) Filed: May 5, 2000

Related U.S. Application Data

(60) Provisional application No. 60/133,106, filed on May 7, 1999, provisional application No. 60/133,620, filed on May 11, 1999, provisional application No. 60/160,982, filed on Oct. 22, 1999, and provisional application No. 60/161,192, filed on Oct. 22, 1999.

(51) Int. Cl.$^7$ ................................................. C08K 3/00
(52) U.S. Cl. ....................... 524/501; 524/500; 524/515; 524/522
(58) Field of Search ............................ 524/501, 502, 524/515, 522

(56) References Cited

U.S. PATENT DOCUMENTS

| | | |
|---|---|---|
| 3,594,337 A | 7/1971 | Shea ........................... 260/17.4 |
| 4,144,157 A | 3/1979 | Guse et al. |
| 4,474,923 A | 10/1984 | Keskey et al. |
| 4,540,739 A | 9/1985 | Midgley |
| 4,599,265 A | 7/1986 | Esmay |
| 4,925,908 A | 5/1990 | Bernard et al. |
| 5,120,796 A | 6/1992 | Fukuchi ........................ 525/286 |
| 5,164,444 A | 11/1992 | Bernard et al. |
| 5,189,126 A | 2/1993 | Bernard et al. |
| 5,229,434 A | 7/1993 | Fukuchi ........................ 522/110 |
| 5,416,134 A | 5/1995 | Skoglund |
| 5,623,011 A | 4/1997 | Bernard |
| 5,723,191 A | 3/1998 | Plamthottam et al. |
| 5,773,534 A | 6/1998 | Antonelli et al. ............. 526/82 |
| 5,830,571 A | 11/1998 | Mann et al. |
| 5,886,101 A | 3/1999 | Sommerfeld et al. ....... 525/112 |

FOREIGN PATENT DOCUMENTS

| | | |
|---|---|---|
| AU | 562757 | 5/1987 |
| EP | 0 079 725 A2 | 5/1983 |
| EP | 0303430 | 2/1989 |
| EP | 0 312 228 A1 | 4/1989 |
| EP | 0 415 593 A1 | 3/1991 |
| WO | 94/20586 | 9/1994 |

OTHER PUBLICATIONS

Tkaczuk, Eliminating Coater Packages with Coater–Ready PSA Emulsions, Adhesives Age (Sep. 94), All Pages.
Tobing, Synthesis And Structure Property Studies In Acrylic Pressure Sensitive Adhesives (Dissertation) Lehigh University, Nov. 10, 1999, All Pages.
International Preliminary Examination Report dated Oct. 1, 2001, for Application PCT/US00/12218.
Notification of Transmittal of the International Search Report, International Application No. PCT/US00/12218, dated Aug. 14, 2000.
Supplementary European Search Report; Application No. EP 00 92 8830; dated Oct. 10, 2002.
Herber; "Deutsche Patent–Sprache in der Lacktechnik"; Farbe & Lack 104, Jahrgang 6/98.

*Primary Examiner*—Edward J. Cain
(74) *Attorney, Agent, or Firm*—Renner, Otto, Boisselle & Sklar, LLP

(57) ABSTRACT

This invention relates to an adhesive composition comprising: microgels of at least one acrylic polymer; and an interlinking polymer covalently bonding at least some of said microgels to each other through said interlinking polymer. In one embodiment, the adhesive further comprises at least one non-gelled polymer, said interlinking polymer covalently bonding at least some of said microgels to said non-gelled polymer.

In one embodiment, the invention relates to an aqueous dispersion, comprising: water; microgels of at least one acrylic polymer dispersed in said water; and at least one interlinking polymer capable of covalently bonding said microgels to each other through said interlinking polymer. In one embodiment, the dispersion further comprises at least one non-gelled polymer, and the interlinking polymer is capable of covalently bonding said microgels to said non-gelled polymer. This invention also relates to an adhesive composition made by heating the foregoing aqueous dispersion at a sufficient temperature and for an effective period of time to covalently bond at least some of said microgels to each other through said interlinking polymer, and optionally covalently bond at least some of said microgels to the foregoing non-gelled polymer.

In one embodiment, the adhesive is a pressure sensitive adhesive. These adhesives may be characterized by high peel energy, high tack and high shear holding power.

43 Claims, 11 Drawing Sheets

FIG. 1 Interlinking of the microgels by the linear polymer.

DMA of monodisperse poly(2-ethylhexyl acrylate). $M_w$ = 241,800 g/mol, PDI = 1.13.

DMA of monodisperse poly(n-butyl acrylate). $M_w$ = 263,000 g/mol, PDI = 1.16.

FIG. 4  GPC molecular weight distribution and cumulative curves of polydisperse P(2EHA-stat-AA) 97.5/2.5 by wt. made by solution polymerization.

FIG. 5  DMA of polydisperse P(2EHA-stat-AA) 97.5/2.5 by wt. made by solution polymerization.

FIG. 6 Adhesive performance of Emulsion 1/Emulsion 2 blends ($M_c < M_e$).

FIG. 7 Adhesive performance of Emulsion 1/Emulsion 4 blends ($M_c \approx M_e$).

FIG. 8 Adhesive performance of Emulsion 1/Emulsion 3 blends ($M_c > M_e$).

FIG. 9 Adhesive performance of Emulsion 1/Emulsion 5 blends ($M_c > M_e$ and APS as chaser).

Adhesive performance of Emulsion 1/Emulsion 6 blends ($M_c > M_e$ and 4% AA).

CASE 1
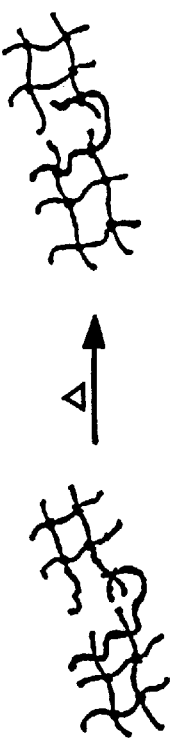
CASE 2
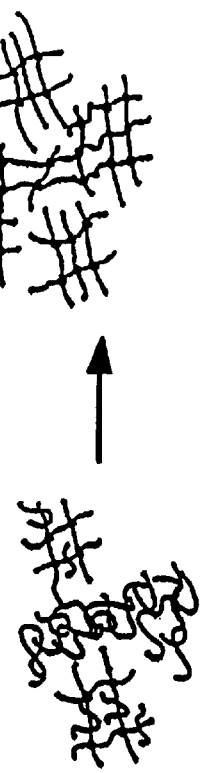
CASE 3
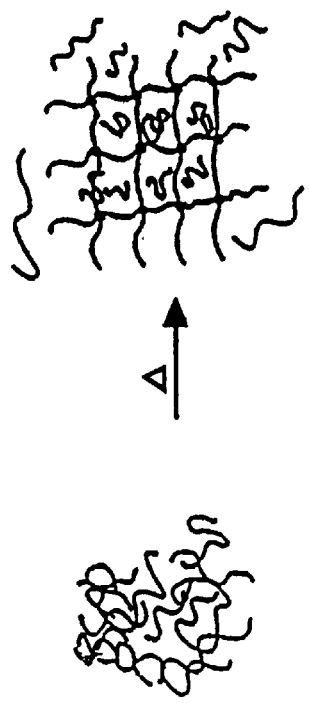
CASE 4
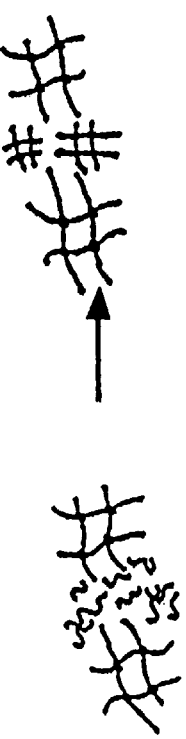
FIG. 11
Network formation in the film.

US 6,608,134 B1

ADHESIVES AND METHOD FOR MAKING SAME

RELATED APPLICATION DATA

This application claims priority to the following U.S. Provisional Applications: Ser. No. 60/133,106, filed May 7, 1999 entitled "Tackified Acrylic Emulsion"; Ser. No. 60/133,620, filed May 11, 1999 entitled "Tackified Acrylic Emulsion"; U.S. Ser. No. 60/160,982, filed Oct. 22, 1999 entitled "Emulsion Pressure Sensitive Adhesives and Method for Making Same"; and U.S. Ser. No. 60/161,192, filed Oct. 22, 1999 entitled "Synthesis and Structure Property Studies in Acrylic Pressure Sensitive Adhesives." The disclosures in these provisional applications are incorporated herein by reference in this application in their entireties.

TECHNICAL FIELD

This invention relates to adhesives and to methods for making such adhesives. In one embodiment, the adhesive is a pressure sensitive adhesive. These adhesives are comprised of microgels of acrylic polymer covalently bonded to each other and optionally to a non-gelled polymer through an interlinking polymer. In one embodiment, these adhesives are characterized by high peel energy, high tack and high shear holding power.

BACKGROUND OF THE INVENTION

Pressure sensitive adhesives (PSAs) are viscoelastic-elastomeric materials that can adhere strongly to a variety of substrates upon application of light contact pressure and short contact time. PSA applications range from various tape and label products used for industrial, medical and consumer markets. In these applications, PSAs are normally coated onto face or backing materials at 15–100 $\mu$m dry film thickness. Typical face stock materials are paper, film and foil. The PSA coated face stocks may be printed and used as labels or tapes.

Polymers used in making PSAs are primarily divided into styrenic block copolymer (SBC) and acrylic. SBCs are mainly used for paper label and Oriented Polypropylene (OPP) tapes due to their highly aggressive tack and moderate shear holding power. SBCs exist in a two phase morphology, the first a hard polystyrene domain residing in the second, a polyisoprene rubber matrix. This morphology allows the SBC to be compounded with a high loading of hydrocarbon tackifiers to increase tack without significantly reducing shear. This is possible because the tackifier is compatible only with the polyisoprene phase.

Acrylics are mainly used in film and specialty paper labels because of their optical clarity, oxidative and UV-stability, and resistance to bleeding or migration into the face stock material. Unlike SBCs, acrylics are inherently tacky due to their high entanglement molecular weight ($M_e$) without the need of adding tackifier. The monomers most frequently used in making acrylic PSAs are 2-ethyl hexyl acrylate (2EHA), n-butyl acrylate (n-BA) and iso-octyl acrylate (i-OA). A variety of comonomers such as acrylic acid (AA), methyl acrylate (MA), vinyl acetate (VA), styrene (Sty), methyl methacrylate (MMA), dioctyl maleate (DOM), and others have been used to tailor the adhesive performance.

Within the acrylic family, PSAs can be divided into solvent borne, emulsion, suspension and hot melt. Solvent borne acrylic PSAs may be prepared by semi-continuous solution polymerization of the above monomers using an oil soluble initiator. Aluminum acetylacetonate (AAA) crosslinker in solution may be post added and the film cast undergoes a crosslinking reaction after the solvent evaporates. Acrylic emulsion PSAs have been prepared by semi-continuous emulsion polymerization of the above monomers using water soluble thermal or redox initiators to form a polymer late. It is common for acrylic emulsion PSA to contain a high level of microgels as a result of chain transfer to polymer reactions during polymerization. Batch suspension polymerization may be used to prepare 100–200 $\mu$m acrylic polymer particles suspended in water. These microspheres when coated at low coat weight (ca. 15 g/m$^2$) form discontinuous film which provide excellent PSA removability on various substrates (e.g., Post-It Notes®). Acrylic hot melts may be prepared by solution polymerization of the above monomers along with small amount of UV-reactive comonomer. The solvent is subsequently stripped and the 100% solid molten polymer cast onto a face stock and UV-cured to build cohesive strength.

Environmental regulations such as the Clean Air Act have placed strict restrictions on VOC emissions. Thus, the use of solvent-borne acrylic PSAs has declined steadily for the past ten years. Despite the continuing decline, acrylic solution PSAs are still in use today for high performance applications requiring high tack, peel and excellent shear holding power. Furthermore, acrylic solution PSA is still the choice for clear film label application requiring pasteurization.

In general, there are two major weaknesses of acrylic emulsion PSAs which limit their usage compared to their solvent counterparts. First, for the same degree of crosslinking or gel content, acrylic emulsion PSA film has much lower shear holding power compared to that of solvent-based acrylic PSAs. Second, acrylic emulsion film, due to the surfactant presence, becomes opaque after exposure to water vapor. This problem also is known as "water whitening", and occurs in emulsion cast PSA films.

There are several reasons that have been suggested for the inferiority of acrylic emulsion PSA films compared to their solvent counterparts in terms of their loop tack, peel and shear holding power. Incomplete latex film formation of poly(2-ethyl hexyl methacrylate) [P(2EHMA)] caused lower viscoelastic energy dissipation which brought lower peel compared to that of solution cast film. Surfactant migration onto the film-substrate boundary layer was shown to reduce peel. However, various studies have shown that the thick surfactant boundary layer could be avoided and perhaps the peel could even be increased if the surfactant used was a plasticizing type. An example of plasticizing type surfactant is the nonyl phenol ethoxylates which are used widely in PSA lattices. Starting in the early 1980's, large tackifier suppliers such as Hercules, Arizona Chemical and AKZO Nobel began dispersing some tackifiers in water to form 0.2–1 $\mu$m particle diameter dispersions. These tackifier dispersions could be blended at 15–30 wt. % with acrylic emulsions to increase the PSA film tack and peel. Tackified acrylic emulsion PSAs have enjoyed significant market growth for the past ten years in paper label applications. However, although both solvent and water borne acrylic PSAs are derived from the same monomers, the adhesive (peel and tack) and cohesive (shear holding power) properties of emulsion PSAs are inferior to those of solvent PSAs.

In order to increase the peel energy of emulsion acrylic PSAs, aqueous tackifier dispersion was added at 15–25 wt. % into the base latex. See, for example, U.S. Pat. No. 5,623,011. There are numerous problems created by this technology due to a lack of understanding of the emulsion film formation and the formation of the network morphology. Build-up on the die during high speed rotary die cutting process was found as well as significantly lower shear holding power when compared to that of the neat emulsion. More surprisingly, peel energy from low surface energy substrates such as high density polyethylene (HDPE) or low density polyethylene (LDPE) showed little improvement compared to that of the neat emulsion.

U.S. Pat. No. 4,144,157 discloses a self-adhesive composition comprising a crosslinked copolymer based on (a) 0.01–5 wt % of acrylic or methacrylic [(2-alkoxy-2-phenyl-2-benzoyl) ethyl] esters as photoinitiators with (b) at least one monomer capable of producing a self-adhesive polymer, in which the composition is crosslinked by exposure to UV radiation. The polymerization of the photoinitiator (a) with the monomer (b) may be by emulsion polymerization.

U.S. Pat. No. 4,474,923 discloses self-curable latex compositions which contain particles of an oxazoline-modified polymer and particles of a coreactive polymer. These latex compositions are curable, yielding films and other articles which are described as having good tensile and elongation properties and excellent resistance to water and aqueous fluids. These latex compositions are self-curing at room temperature.

U.S. Pat. No. 5,164,444 discloses emulsion PSA formulations comprising alkyl acrylates copolymerized with unsaturated carboxylic acids, vinyl esters and diesters of dicarboxylic acids and, in addition to these basic ingredients, may also include a chelating monomer, such as acetoacetoxy ethyl methacrylate, which enables complex formation with metal salts. U.S. Pat. No. 5,189,126 discloses an emulsion PSA including the same basic ingredients as the '444 patent plus small amounts, i.e., 0.1 to 1 percent, of a reactive multifunctional monomer having a cyanurate or phosphate functionality. The emulsion PSAs of both the '444 and the '126 patents may also include a reactive surfactant, such as sodium vinyl sulfonate or sodium styrene sulfonate, which polymerizes and becomes part of the emulsion polymer, and may be ionically cross-linked by metal salts such as aluminum acetate. Both the '444 and the '126 patents disclose that while the multifunctional monomer provides some improvement in the shear performance, it still may be necessary to cross-link the polymer by complex formation with the metal salt. The '444 patent teaches that the chelating monomer may alter the gel content and/or glass transition temperature of the resulting PSA. Similarly, the '126 patent teaches that adding multifunctional monomers to the copolymer may alter the gel content and/or glass transition temperature of the resulting PSA.

Although the foregoing emulsion PSAs represent a significant advance over previously known PSAs, the formulations have continued to be developed in an effort to provide the desired adhesive features of peel and tack, and the cohesive property of shear holding power. U.S. Pat. No. 5,623,011 discloses an emulsion polymer formed from a monomer mix comprising 35 to 60% by weight alkyl acrylates, 15 to 35% by weight vinyl esters, 15 to 35% by weight diesters of dicarboxylic acids, and up to about 5% by weight unsaturated carboxylic acids, and (b) a tackifier having an acid number of from about 30 to about 60 and a ring and ball softening point of from about 50° C. to about 70° C. In one embodiment, the tackifier has a hydrocarbon resin component and a rosin-based resin component, with the preferred tackifier comprising an aromatic modified aliphatic resin containing wood rosin. A preferred adhesive comprises 8 to 12 parts by weight tackifier per 100 parts by weight polymer.

U.S. Pat. No. 5,723,191 discloses tackified PSAs comprising a copolymer based on an acrylic backbone, with a glycidyl monomer, unsaturated carboxylic acid monomer, preferably a vinyl lactam monomer, and a tackifier, in which the adhesives are dual curable and are prepared in a mixture of organic solvents.

SUMMARY OF THE INVENTION

This invention relates to an adhesive composition comprising: microgels of at least one acrylic polymer; and an interlinking polymer covalently bonding at least some of said microgels to each other through said interlinking polymer. In one embodiment, the adhesive further comprises at least one non-gelled polymer, said interlinking polymer covalently bonding at least some of said microgels to said non-gelled polymer.

In one embodiment, the invention relates to an aqueous dispersion, comprising: water; microgels of at least one acrylic polymer dispersed in said water; and at least one interlinking polymer capable of covalently bonding said microgels to each other through said interlinking polymer. In one embodiment, the dispersion further comprises at least one non-gelled polymer, and the interlinking polymer is capable of covalently bonding said microgels to said non-gelled polymer. This invention also relates to an adhesive composition made by heating the foregoing aqueous dispersion at a sufficient temperature and for an effective period of time to covalently bond at least some of said microgels to each other through said interlinking polymer, and optionally covalently bond at least some of said microgels to the foregoing non-gelled polymer.

In one embodiment, the adhesive is a pressure sensitive adhesive. These adhesives may be characterized by high peel energy, high tack and high shear holding power.

In one embodiment, this invention relates to a process for making an adhesive, comprising:
(i) forming a monomer emulsion comprising water, at least one acrylic monomer, optionally at least one comonomer, an unsaturated carboxylic acid, optionally a chain transfer agent, and an interlinking agent;
(ii) mixing a polymerization initiator with said monomer emulsion and polymerizing the resulting mixture to form an aqueous dispersion comprising microgels of at least one polymer; and
(iii) heating the dispersion formed in step (ii) at a sufficient temperature and for an effective period of time to covalently bond at least some of said microgels to each other through said interlinking agent.

In one embodiment, this invention relates to a process for making an adhesive, comprising:
(A) forming a first aqueous dispersion comprising microgels of at least one polymer dispersed in water by
(i) forming a first monomer emulsion comprising water, at least one acrylic monomer, optionally at least one comonomer, optionally a chain transfer agent, and an unsaturated carboxylic acid; and
(ii) mixing a polymerization initiator with said first monomer emulsion and polymerizing the resulting mixture to form said first aqueous dispersion;
(B) forming a second aqueous dispersion comprising a non-gelled polymer by
(i) forming a second monomer emulsion comprising water, at least one acrylic monomer, optionally at least one comonomer, an unsaturated carboxylic acid, optionally a chain transfer agent, and an interlinking agent;
(ii) mixing a polymerization initiator with said second monomer emulsion and polymerizing the resulting mixture to form said second aqueous dispersion;

(C) combining the first and second aqueous dispersions to form a combined aqueous dispersion; and (D) heating the combined aqueous dispersion at a sufficient temperature and for an effective period of time to covalently bond at least some of the microgels to at least some of the non-gelled polymer.

BRIEF DESCRIPTION OF THE DRAWINGS

FIG. 11 is a schematic diagram of network formation in films made in four different cases of polymers, showing various relationships between the presence of microgels and between $M_w$ and $M_e$.

DETAILED DESCRIPTION

Figure 1:
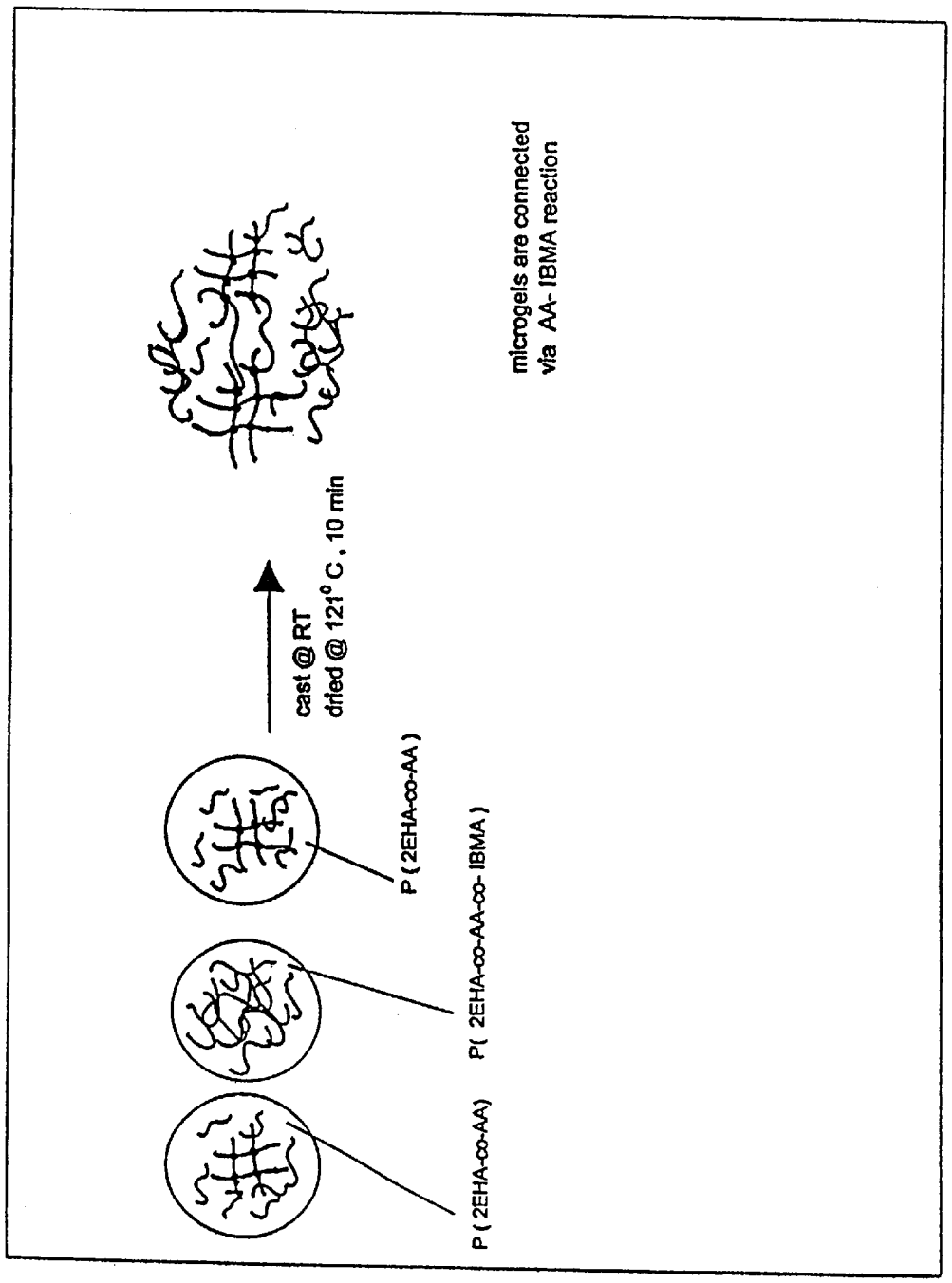
FIG. 1 is a schematic representation of the interlinking of microgels by the linear polymer, in accordance with one embodiment of the invention.

The adhesives provided by this invention are, in one embodiment, pressure sensitive adhesives. In one embodiment, these adhesives are characterized by high peel energy, high tack and high shear holding power. These adhesives, in one embodiment, exhibit excellent processability, high adhesion, and high tack to polar, nonpolar and/or difficult-to-bond substrates with excellent cohesion. These adhesives have properties sufficient to make them useful for replacing solvent polymers, tackified styrene-butadiene emulsion pressure-sensitive adhesives, and nontackified and tackified acrylic pressure-sensitive adhesives. Improvements over tackified styrene-butadiene resin adhesives include, in one embodiment, better aging and no edge ooze or bleed as part of a release liner adhesive face stock laminate. In addition, being functional as a single polymer, there is a minimal or no need for compounding and tackification. The improved performance characteristics of the inventive adhesives enable them to be used on almost any available face stock. In one embodiment, these adhesives exhibit excellent moisture resistance enabling them to be used for medical and moisture-resistant adhesive applications.

As compared to prior art acrylic pressure-sensitive adhesives which do not provide good adhesion to nonpolar surfaces such as polyolefins and certain other surfaces such as recycled corrugated board, the inventive adhesives, in one embodiment, exhibit excellent adhesion to non-polar surfaces and corrugated board and good elevated-temperature performance. The inventive adhesives, in one embodiment, do not require the addition of a tackifier. However, due to the interlinks with the microgels of the present invention, tackifiers may be added to the inventive adhesives without the attendant loss in cohesive strength which usually results when tackifiers are used.

The inventive adhesives are comprised of microgels of at least one acrylic polymer or copolymer; and an interlinking polymer covalently bonding at least some of the microgels to each other through said interlinking polymer. In one embodiment, the adhesive further comprises at least one non-gelled polymer, and the interlinking agent covalently bonds at least some of the microgels to at least some of the non-gelled polymer. In one embodiment, the average molecular weight between crosslinks ($M_c$) of the microgels is greater than the entanglement molecular weight ($M_e$) of the interlinking polymer, and the weight average molecular weight ($M_w$) of the interlinking polymer is greater than two times $M_e$. In one embodiment, $M_w$ is in the range from about $4 \times M_e$ to about $10 \times M_e$. In one embodiment, $M_w$ is in the range from about $2 \times M_e$ to about $6 \times M_e$. In one embodiment, $M_w$ is in the range from about $3 \times M_e$ to about $5 \times M_e$. In one embodiment, $M_w$ is in the range from about $4 \times M_e$ to about $8 \times M_e$. In one embodiment, $M_w$ is in the range from about $10 \times M_e$ to about $15 \times M_e$. In one embodiment, if $M_w$ is much in excess of 20 times $M_e$, the favorable properties of high tack and peel combined with high shear deteriorate.

With respect to the relationship that $M_c$ should exceed $M_e$, in one embodiment, $M_c > M_e$, in one embodiment, $M_c > 1.05\ M_e$, in one embodiment, $M_c > 1.25\ M_e$, in one embodiment, $M_c > 1.5\ M_e$, and in one embodiment, $M_c > 2.0\ M_e$, and in one embodiment, $M_c > 2.5\ M_e$.

The $M_w$ of the interlinking polymer may range from about 100,000 to about 300,000, and in one embodiment about 150,000 to about 200,000. $M_e$ may have a value in the range of about 20,000 to about 80,000, and in one embodiment about 20,000 to about 40,000. $M_c$ may have a value in the range of about 30,000 to about 100,000.

The weight average molecular weight of the acrylic polymer or copolymer may be in the range of about 100,000 to about 1,000,000, and in one embodiment about 100,000 to about 500,000 relative to the polystyrene standard as determined by gel permeation chromatography (GPC).

The microgels may have an average diameter in the range of about 50 to about 1000 nanometers, and in one embodiment about 50 to about 500 nanometers, and in one embodiment about 50 to about 300 nanometers, and in one embodiment about 100 to about 200 nanometers.

In one embodiment, the concentration of the microgels in the inventive adhesive is from about 20 to about 80% by weight based on the total solids in the adhesive, and in one embodiment from about 40 to about 75% by weight.

In one embodiment, the inventive adhesive has a gel to sol weight ratio of about 20:80 to about 90:10, and in one embodiment about 40:60 to about 80:20. In this regard, gel represents the amount of polymer which is insoluble in tetrahydrofuran expressed in percent by weight and determined by the membrane gel partitioning method. In this method, about 60 to 80 milligrams of 100 percent solid polymer is weighed onto a polytetrofluoroethylene-coated millipore membrane disk of 10 micrometer porosity and 47 mm diameter. The disk is heat sealed and transferred to a scintillation vial. About 15 milliliters of tetrahydrofuran is added to the vial and the vial is rotated on a shaker for 16 to 24 hours. The sealed disk is then removed, washed with tetrahydrofuran, and dried first by placing it on a Whatman No. 1 filter paper, followed by exposure to 100° C. in the oven for a few hours. The dried disk is weighed and the insoluble portion of the polymer determined by the equation:

$$\text{Percent insoluble} = \frac{(b-c) \times 100}{a} = \% \text{ gel}$$

wherein
  a=a total weight of 100 percent solids polymer
  b=the weight of the dry gel plus membrane
  c=the weight of PTFE disk alone.

The acrylic polymer and the non-gelled polymer may be derived from acrylates, methacrylates, or mixtures thereof. The acrylates include $C_1$ to about $C_{20}$ allkyl, aryl or cyclic acrylates such as methyl acrylate, ethyl acrylate, phenyl acrylate, butyl acrylate, 2-ethylhexyl acrylate, isobornyl acrylate and functional derivatives of these acrylates such as 2-hydroxy ethyl acrylate, 2-chloro ethyl acrylate, and the like. These compounds typically contain from about 3 to about 20 carbon atoms, and in one embodiment about 3 to about 8 carbon atoms. The methacrylates include $C_1$ to about $C_{20}$ alkyl, aryl or cyclic methacrylates such as methyl methacrylate, ethyl methacrylate, butyl methacrylate, 2-ethylhexyl methacrylate, phenyl methacrylate, isobornyl methacrylate, and functional derivatives of these methacrylates such as 2-hydroxyethyl methacrylate, 2-chloroethyl methacrylate, and the like. These compounds typically contain from about 4 to about 20 carbon atoms, and in one embodiment about 4 to about 8 carbon atoms.

The acrylic polymer and the non-gelled polymer may be copolymers derived from at least one acrylate monomer and at least one polymerizable comonomer. The polymerizable comonomers include acrylonitriles, acrylamides, methacrylamides, vinyl esters, vinyl ethers, vinyl amides, vinyl ketones, styrenes, halogen containing monomers, ionic monomers, acid containing monomers, base containing monomers, olefins, and mixtures of two or more thereof.

The acrylonitriles include acrylonitrile and alkyl substituted acrylonitriles. The alkyl groups typically contain from 1 to about 20 carbon atoms, and in one embodiment 1 to about 10 carbon atoms, and in one embodiment 1 to about 5 carbon atoms. Examples include methacrylonitrile and ethacrylonitrile.

The acrylamides include acrylamide and its derivatives including the N-substituted alkyl and aryl derivatives thereof. These include N-methyl acrylamide, N,N-dimethyl acrylamide, t-octyl acrylamide and the like. The methacrylamides include methacrylamide and its derivatives including the N-substituted alkyl and aryl derivatives thereof. The vinyl esters include vinyl acetate, vinyl propionate, vinyl butyrate, and the like. The vinyl ethers include vinyl ethers having 1 to about 8 carbon atoms including ethylvinyl ether, butylvinyl ether, and the like. The vinyl amides include vinyl amides having 1 to about 8 carbon atoms including vinyl pyrrolidone, and the like. The vinyl ketones include vinyl ketones having 1 to about 8 carbon atoms including ethylvinyl ketone, butylvinyl ketone, and the like.

The styrenes include styrene, indene, and substituted styrenes represented by the formula

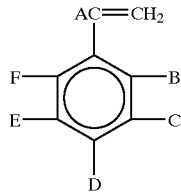

wherein each of A, B, C, D, E and F is independently selected from hydrogen, $C_1$ to about $C_4$ alkyl or alkoxy groups (especially methyl or methoxy groups,) halogroups (especially chloro), thio, cyano, carboxylic acid or ester, or fluorinated alkyl groups of 1 to about 4 carbon atoms. Examples include methyl styrene (sometimes referred to as vinyl toluene), alpha-methyl styrene, divinylbenzene, chlorostyrene, chloromethyl styrene, and the like.

The halogen-containing monomers include vinyl chloride, vinyl bromide, vinyl fluoride, vinylidene chloride, vinylidene bromide, vinylidene fluoride, halogen substituted propylene monomers, and the like, with vinyl bromide and vinylidene chloride being preferred. The ionic monomers include sodium vinyl sulfonate, sodium styrene sulfonate, sodium methallyl sulfonate, sodium acrylate, sodium methacrylate, and the like, with sodium vinyl sulfonate, sodium styrene sulfonate and sodium methallyl sulfonate being preferred.

The acid containing monomers include acrylic acid, methacrylic acid, vinyl sulfonic acid, itaconic acid, and the like. The base containing monomers include vinyl pyridine, N-amino ethyl acrylamide, N-amino propyl acrylamide, N-aminoethyl acrylate, N-aminoethyl methacrylate, and the like. The olefins include isoprene, butadiene, $C_2$ to about $C_8$ straight chained and branched alpha-olefins such as ethylene, propylene, butylene, isobutylene, diisobutylene, 4-methyl pentene-1, 1-butene, 1-hexene, 1-octene, and the like.

In one embodiment, the acrylic polymer is poly (2-ethylhexyl acrylate-co-acrylic adic), poly (n-butyl acrylate-co-acrylic acid), or a mixture thereof.

In one embodiment, the present invention relates to blends of high gel containing poly(2-ethylhexyl acrylate-co-acrylic acid) and essentially gel free poly(2-ethylhexyl acrylate-co-acrylic acid-co-IBMA) latices. (The terms "-co-" or "stat," as used herein, means that the monomers connected thereby are copolymerized.)

The interlinking polymer may be a multifunctional, and in one embodiment difunctional, compound comprising at least one first functional group having ethylenic unsaturation (i.e., vinyl) and at least one second functional group selected from epoxy, akloxy, hydroxy, amino, isocyanate, oxazoline, acrylamido, or cyano. In one embodiment, the interlinking polymer is derived from at least one interlinking agent which may be isobutoxymethyl acrylamide, isobutoxy acrylamide, methylol acrylamide, isobutoxy methyl methacrylamide, isobutoxy methacrylamide, methylol methacrylamide, butoxy methyl acrylamide or a mixture of two or more thereof. The interlinking polymer may be made, for example, by incorporating any of the foregoing interlinking agents into any of the foregoing acrylate polymers or copolymers. In one embodiment, the interlinking agent is made by incorporating isobutoxymethyl acrylamide into poly (2-ethylhexyl acrylate-co-acrylic acid), poly (n-butyl acrylate-co-acrylic acid), or a mixture thereof.

The interlinking polymer (or covalent crosslinking agent) provides a covalent bond or "interlink" between microgel particles, thereby increasing the shear holding power of the adhesives of the present invention. The interlinking polymer, in one embodiment, also provides a covalent bond between microgel particles and a non-gelled polymer. FIG. 1 shows a schematic representation of the interlinking reaction of two microgels P(2-EHA-co-AA) by the linear gel-free polymer P(2-EHA-co-AA-co-IBMA) to form microgels interlinked by the cross-linking reaction between AA and IBMA. Although not shown, a similar reaction takes place when two microgels, at least one of which contains P(2-EHA-co-AA-co-IBMA), are interlinked by the cross-linking reaction between the AA of one microgel and the IBMA of another microgel particle. Also, two microgels may be interlinked together by the linear polymer.

The term "interlinking" (and its variants, e.g., interlink, interlinked) refers to a covalent bond formed between microgel particles, or between such microgel particles and a gel-free polymer. Such interlinking is similar to classical crosslinking between linear polymer chains, but differs in that the microgel particles are discrete entities and may themselves include some degree of internal crosslinking between the polymer chains of which the particles are formed.

The present invention improves the crosslink density and reactivity of the microgels in forming interlinkages with the non-gelled polymer in the film, when the two latices are mixed together and heated. Such interlinkages bring an unexpected increase in the shear of the resulting adhesive film. The interlinkages are provided, in one embodiment, by the reaction of acrylic acid in the microgels from the high gel containing latex and IBMA in the linear polymer from the gel free latex when the film is heated at 121° C. for 10 minutes as shown in FIG. 1.

In one embodiment, the inventive adhesives may be applied to substrates at a coat weight of about 3 to about 100 grams per square meter, "gsm" or $g/m^2$. In one embodiment, the coat weight is in the range from about 10 to about 50 $g/m^2$. In one embodiment, the coat weight is in the range from about 15 to about 35 $g/m^2$. In one embodiment, the coat weight is about 28 $g/m^2$. The adhesive may be applied using any technique known in the art including roller coating, curtain coating, brushing, spraying, knife over roll coating, metering rod coating, reverse roller coating, doctor knife coating, dipping, die coating, and the like.

The inventive adhesives may be made from aqueous dispersions comprised of water, microgels of at least one acrylic polymer and optionally at least one copolymer dispersed in said water, and at least one interlinking polymer capable of covalently bonding said microgels to each other through said interlinking polymer. In one embodiment, this dispersion further comprises at least one non-gelled polymer and said interlinking polymer is capable of covalently bonding said microgels to said non-gelled polymer. In one embodiment, these aqueous dispersons have a total solids content in the range from about 30% to about 65% by weight, and in one embodiment about 45% to about 55% by weight.

The process for making the inventive adhesives comprises, in one embodiment, the steps of:

(i) forming a monomer emulsion comprising water, at least one acrylic monomer, optionally at least one or more comonomers, an unsaturated carboxylic acid, optionally a chain transfer agent, and an interlinking agent;

(ii) mixing a polymerization initiator with said monomer emulsion and polymerizing the resulting mixture to form an aqueous dispersion comprising microgels of at least one polymer; and (iii) heating the dispersion formed in step (ii) at a sufficient temperature and for an effective period of time to covalently bond at least some of said microgels with each other through said interlinking agent.

The acrylic monomers, polymerizable comonomers and interlinking agents that may be used are discussed above. The unsaturated carboxylic acid may contain from about 3 to about 20 carbon atoms, and in one embodiment about 3 to about 10 carbon atoms, and in one embodiment about 3 to about 5 carbon atoms. The unsaturated carboxylic acid may include, among others, acrylic acid, methacrylic acid, itaconic acid, fumaric acid and the like. In one embodiment, the unsaturated carboxylic acid is acrylic acid, methacrylic acid., or a mixture acrylic and methacrylic acids. In one embodiment, the mixture comprises a major amount of acrylic acid and a minor amount of methacrylic acid. In one embodiment, the mixture comprises a major amount of methacrylic acid and a minor amount of acrylic acid.

The chain transfer agent is an optional ingredient but when used may be, for example, n-dodecyl mercaptan, t-butyl mercaptan, carbon tetrachloride, and the like.

The polymerization initiator may be potassium persulfate, t-butyl hydrogen peroxide, peroxydisulfate, 2,2'azo-bis-isobutyronitrile or 2,2'-azobis (2-amidinopropane) dihydrochloride, 2,2'-azobis[N-(2-carboxyethyl)-2-methylpropionamidine] hydrate, 2,2'-azobis[2-[1-(2-hydroxyethyl)-2-imidazoline-2-yl]propane] dihydrochloride, 2,2'-azobis[2-methyl-N-(2-hydroxyethyl) propionamide], and the like. Mixtures of two or more of these initiators may be used.

The concentration of the acrylic monomer in the monomer emulsion may range from about 40 to about 99% by weight, and in one embodiment about 80 to about 97.5% by weight based on the weight of the emulsion. The concentration of comonomer may range up to about 60% by weight, and in one embodiment about 10 to about 20% by weight. The concentration of unsaturated carboxylic acid may range from about 1 to about 10% by weight, and in one embodiment about 2 to about 5% by weight. The concentration of the chain transfer agent may range up to about 0.5% by weight based on the total monomer concentration, and in one embodiment about 0.01 to about 0.5% by weight, and in one embodiment about 0.05 to about 0.2% by weight. The concentration of interlinking agent may range from about 0.5 to about 10% by weight, and in one embodiment about 0.5 to about 2% by weight. The concentration of polymerization initiator may range from about 0.1 to about 1% by weight, and in one embodiment about 0.2 to about 0.3% by weight.

The monomer proportions are normally adjusted in such a way that the resulting adhesive has a glass transition temperature (Tg) less than about –20° C. to provide an acceptable balance of adhesion and tack at room temperature and elevated temperatures as determined by dynamic mechanical analysis from the maximum tan δ location.

To maintain good balance of peel and tack with high shear it may be desirable to control the polymerization to maintain a relatively low molecular weight of the polymer by the use of chain transfer agents such as n-dodecyl mercaptan (n-DDM) and to use higher levels of initiator than what is commonly used. In one embodiment, the level of n-DDM in this invention is up to about 0.2% by weight of the monomers, preferably about 0.05 to about 0.1% by weight, and the level of initiator is about 0.6 to about 0.75% by weight based on the weight of total monomers in the composition. Amounts exceeding these levels can result in cohesive failure in peel adhesion on certain substrates which will be detrimental to the product application.

The procedures for making gelled acrylic polymers as well as non-gelled acrylic polymers are well known in the art. These procedures as well as appropriate operating parameters are discussed, for example, in P. A. Lovell and M. S. El-Aasser, "Emulsion Polymerization and Emulsion Polymers," John Wiley & Sons, New York, 1997, which is incorporated herein by reference.

The temperature used in step (i) may range from about 15 to about 40° C. The temperature used in step (ii) is dependent upon the type of polymerization initiator that is used.

For example, if the initiator is a thermal initiator the temperature may range from about 60 to about 80° C. If the initiator is a redox initiator, the temperature may range from about −15 to about 40° C. The temperature used in step (iii) may range from about 100 to about 200° C., and in one embodiment about 110° C. to about 150° C. Step (iii) may be conducted for an effective period of time to remove all or substantially all moisture from the resulting adhesive.

The level of agitation will vary depending on the system and will influence conversion. Typically, about 30 to 50% by weight of the total initiator may be added along with an initial monomer charge to the reactor, and the rest may be added along with the balance of monomers during polymerization over a period of from about 4 to about 5 hours.

In one embodiment, the inventive adhesives are made be the steps of:
  (A) forming a first aqueous dispersion comprising microgels of at least one polymer dispersed in water by
    (i) forming a first monomer emulsion comprising water, at least one acrylic monomer, optionally at least one comonomer, optionally a chain transfer agent, and an unsaturated carboxylic acid;
    (ii) mixing a polymerization initiator with said first monomer emulsion and polymerizing the resulting mixture to form said first aqueous dispersion;
  (B) forming a second aqueous dispersion comprising a non-gelled polymer by
    (i) forming a second monomer emulsion comprising water, at least one acrylic monomer, optionally at least one comonomer, optionally a chain transfer agent, an unsaturated carboxylic acid, and an interlinking agent;
    (ii) mixing a polymerization initiator with said second monomer emulsion and polymerizing the resulting mixture to form said second aqueous dispersion;
  (C) combining the first and second aqueous dispersions to form a combined aqueous dispersion; and
  (D) heating the combined aqueous dispersion at a sufficient temperature and for an effective period of time to covalently bond at least some of the microgels to at least some of the non-gelled polymer.

The concentration of the acrylic monomer in the monomer emulsion during step (A) may range from about 40 to about 99% by weight, and in one embodiment about 80 to about 97.5% by weight based on the weight of the emulsion. The concentration of comonomer may range up to about 60% by weight, and in one embodiment about 10 to about 20% by weight. The concentration of the chain transfer agent may range up to about 0.5% by weight based on the total monomer concentration, and in one embodiment about 0.01 to about 0.5% by weight, and in one embodiment about 0.05 to about 0.2% by weight. The concentration of unsaturated carboxylic acid may range from about 1 to about 10% by weight, and in one embodiment about 2 to about 5% by weight. The concentration of polymerization initiator may range from about 0.1 to about 1% by weight, and in one embodiment about 0.2 to about 0.3% by weight.

The concentration of the acrylic monomer in the monomer emulsion during step (B) may range from about 40 to about 99% by weight, and in one embodiment about 80 to about 97.5% by weight based on the weight of the emulsion. The concentration of comonomer may range up to about 60% by weight, and in one embodiment about 10 to about 20% by weight. The concentration of unsaturated carboxylic acid may range from about 1 to about 10% by weight, and in one embodiment about 2 to about 5% by weight. The concentration of the chain transfer agent may range up to about 0.5% by weight based on the total monomer concentration, and in one embodiment about 0.01 to about 0.5% by weight, and in one embodiment about 0.05 to about 0.2% by weight. The concentration of interlinking agent may range from about 0.5 to about 10% by weight, and in one embodiment about 0.5 to about 2% by weight. The concentration of polymerization initiator may range from about 0.1 to about 1% by weight, and in one embodiment about 0.2 to about 0.3% by weight.

The temperatures used in steps (A)(i) and (B)(i) may range from about 15 to about 40° C. The temperatures used in steps (A)(ii) and (B)(ii) are dependent upon the type of polymerization initiator that is used. For example, if the initiator is a thermal initiator the temperature may range from about 60 to about 80° C. If the initiator is a redox initiator, the temperature may range from about −15 to about 40° C. The temperature used in step (D) may range from about 100 to about 200° C., and in one embodiment about 110° C. to about 150° C. Step (D) may be conducted for a sufficient period of time to remove all or substantially all moisture from the resulting adhesive.

It is possible to modify the rheology of the polymer for coating purposes by use of conventional thickeners such as SCT-270 manufactured and sold by Union Carbide and present in an amount up to about 0.2 percent by weight. For general purpose applications, it is desirable to have good adhesion to both hydrophobic substrates such as polyethylene and hydrophilic substrates such as stainless steel and difficult-to-bond recycled corrugated board. Prior art acrylic polymers generally do not exhibit good adhesion to such substrates unless they are modified by addition of a tackifier. This is not required using the adhesive of this invention, although tackifiers can be effectively used to tailor adhesion to a substrate, while maintaining excellent cohesion, i.e., shear strength.

Accordingly, in one embodiment, a tackifier may be combined with the inventive adhesive. The tackifier may be based on, for example, glycerol ester abietic acid. The tackifier may be added in the form of an aqueous dispersion having a mean particle diameter for the tackifier in the dispersion of, for example, about 500±200 nm. In such a dispersion, for example, less than 10% by weight of the tackifier particles may have particle diameters between 2–5 μm. In one embodiment, a tackified adhesive is made by blending about 5 to about 30% by weight tackifier based on weight of the tackifier solids and the total solids content of the adhesive. The blending may be effected at room temperature using a low shear agitator.

In one embodiment the tackifier is cis, trans 1,4 isoprene, vinyl isoprene, or piperylene. In one embodiment, the tackifier is poly(isobornyl methacrylate), rosin ester, or mixed aliphatic/aromatic polymeric tackifier resins.

In one embodiment, the tackifier has a hydrocarbon resin component and a rosin-based resin component. In one embodiment, the tackifier comprises an aromatic modified aliphatic resin containing wood rosin.

In one embodiment, the tackifier is present in an amount from about 5 to about 25 parts (dry weight) per 100 parts (dry weight) of the pressure-sensitive adhesive polymer. In one embodiment, the tackifier is present in an amount from about 8 to about 15 parts (dry weight) per 100 parts (dry weight) of the pressure-sensitive adhesive polymer. In one embodiment, the tackifier is present in an amount from about 8 to about 12 parts (dry weight) per 100 parts (dry weight) of the pressure-sensitive adhesive polymer.

In one embodiment, the tackifiers have an acid number of from about 30 to about 60, preferably 30 to 45, and a ring and ball softening point of from about 50° C. to about 70° C. In one embodiment, the tackifier comprises two parts, namely, a hydrocarbon resin component (e.g., an aromatic modified aliphatic hydrocarbon resin) and a rosin-based resin component, with the two components present in a suitable ratio to provide a desired balance of properties and good adhesion both to polyolefins and recycled corrugated board. Typically, the tackifier is added as an aqueous dispersion. The hydrocarbon resin and rosin-based resin component can be mixed together and dispersed in a single process, or, alternatively, aqueous dispersions of the two components can be blended together in a suitable ratio to obtain the desired acid number and softening point.

In one embodiment, improved performance characteristics are obtained by adding to the emulsion polymer an aqueous dispersion of a tackifier having an acid number of from about 30 to about 60. As used herein, the term "acid number" means the number of milligrams of potassium hydroxide required to neutralize the free acids present in one gram of tackifier.

In one embodiment, the tackifiers used in this invention contain both a hydrocarbon resin component and a rosin-based resin component. In one embodiment, the hydrocarbon resin is an aromatic modified aliphatic hydrocarbon resin, with a ring and ball softening point of from about 60° C. to about 80° C., and having no reactive functional groups. (Pendant phenyl groups and the like are not considered "reactive" in this context.)

Useful hydrocarbon resins include TACOLYN® 1070, an aromatic-modified, aliphatic hydrocarbon resin sold by Hercules Inc.; OR-3013, an experimental resin from Arizona Chemicals.

The rosin-based resin component of the tackifier is a rosin or rosin derivative which, when blended with the hydrocarbon resin, yields the desired acid number and softening point. Such rosin-based resin components include wood rosins, gum rosins, tall oil rosins, fully or partially polymerized rosins, disproportionated rosins, fully or partially hydrogenated rosins, fully or partially esterified rosins, and other modified and/or stabilized rosins and the like. In one embodiment, the rosin is wood rosin, which is primarily abietic acid, with an acid number of from about 155 to about 210. Commercially available high-acid tackifiers include SNOWTACK® 301A, 342A, 385G, 348A, and the like, sold by Eka Nobel.

A two component tackifier containing a hydrocarbon resin and a rosin-based resin component can be prepared by mixing a rosin-based resin dispersion with a hydrocarbon resin dispersion, or vice versa, in a suitable ratio such that the resulting tackifier has an acid number of between about 30 and about 60 (in one embodiment, from about 30 to about 45) and a softening point of between about 50° C. and 70° C., which aids in providing an adhesive which exhibits good adhesion both to substrates such as polyolefins and recycled corrugated board. In one embodiment, the tackifier is ResA 2467, an experimental product developed by Hercules and which is an aromatic modified aliphatic resin containing rosin acid, with an acid number of from 30 to 45 and a softening point of from 55° C. to 65° C.

In one embodiment, the tackifier is added to the emulsion polymer in a positive amount of up to about 25 parts by weight (dry tackifier) per 100 parts of the polymer (dry weight). In one embodiment, the tackifier is added to the emulsion polymer in an amount from about 5 to 15 parts tackifier per 100 parts polymer. In one embodiment, the tackifier is added to the emulsion polymer in an amount from about 8 to about 12 parts tackifier per 100 parts polymer. In one embodiment, the adhesive formulation contains about 8 to 10 parts by weight of ResA 2467 per 100 parts of the emulsion polymer. A good balance of adhesive properties and converting properties is seen with this and similar formulations.

Useful resins include hydrogenated and partially hydrogenated resins such as REGALREZ®0 1018, REGALREZ® 1033, REGALREZ® 1078, R REGALREZ® 1094, REGALREZ® 1126, REGALREZ® 3102, REGALREZ® 6108, etc., produced by Hercules Corporation, can be used. Various terpene phenolic resins of the type SP 560, manufactured and sold by Schenectady Chemical Inc., NIREZ® 1100, manufactured and sold by Arizona Chemical Inc., and PICCOLYTE® S-100, manufactured and sold by Hercules Corporation, are particularly useful tackifiers for the present invention. Various mixed aliphatic and aromatic resins, such as Hercotex AD 1100, manufactured and sold by Hercules Corporation, can be used.

While the resins described above are quite useful for tackifying the polymers of the instant invention, the particular tackifying resin and/or amount selected for a given formulation may depend upon the type of acrylic polymer being tackified. Some resins, such as FORAL® 85, are broadly compatible with acrylic compositions. Others, like REGALREZ® 6108, tackify a limited number of compositions. The tackifying resin or the amount employed is to be substantially compatible with the acrylic polymer. As used herein, the term "substantially compatible" means that when the tackifier and copolymer are combined, the resulting combination is substantially transparent, as opposed to cloudy, to normal vision. Many resins which are known in the prior art as being useful for tackifying acrylic based pressure sensitive adhesives can be effectively used in the practice of the present invention, although the scope of the invention is not limited to only such resins. Resins described in Satas, Handbook of Pressure Sensitive Adhesive Technology, Von Nostrand Reinhold Co., Chap. 20, pages 527–584 (1989) (the resins disclosed therein are incorporated by reference herein) could be used. Resins described in U.S. Pat. No. 4,418,120 and EP 0,303,430 are particularly useful.

In one embodiment, the tackifier is present in an amount of up to about 30% by weight of the inventive adhesive. In one embodiment, the tackifier is present in an amount in the range from about 5% to about 25% by weight of the adhesive. In one embodiment, the tackifier is present in an amount in the range from about 10% to about 20% by weight of the adhesive. In one embodiment, the tackifier is present in an amount in the range from about 15% to about 20% by weight of the adhesive. In one embodiment, the tackifier is present in an amount in the range from about 2% to about 10% by weight of the adhesive. In one embodiment, the tackifier is present in an amount in the range from about 15% to about 25% by weight of the adhesive.

EXAMPLES

Water soluble AIBN initiator, Wako V-50® [2,2'-Azobis (2-amidino propane) dihydrochloride] was obtained from Wako Chemicals USA, Inc. Ammonium persulfate (APS) initiator was obtained form FMC Corporation. Oil soluble AIBN, VAZO® 67 was obtained from DuPont.

The surfactant used was nonyl-phenol ethoxylate sulfate having 4 ethylene-oxide unit (POLYSTEP® B-27) from Stepan Chemical Company. Its activity in $H_2O$ is 30% by weight.

The aqueous tackifier dispersion was based on glycerol ester abietic acid ($M_w$=940, PDI=1.1, DMA Tg=64° C.), SNOWTACK® 920 from AKZO NOBEL. The mean particle diameter was 514±202 nm and the solids content was 58%. The dried version of this tackifier (including the surfactant) was dissolved in toluene to be used in tackification of solvent borne acrylic PSA.

Ammonium hydroxide, $NH_4OH$ (25% concentration by weight in $H_2O$) was obtained from Textile Chemicals. KATHON® LX (biocide) was obtained from Rohm and Haas.

Preparation of Acrylic PSA Using Semi-Continuous Emulsion Polymerization

I. Preparation of Monomer Emulsion

The monomer emulsion was prepared by mixing 133 g of deionized water and 67 g of POLYSTEP® B27 surfactant (30% active) using a magnetic stirrer. The water-surfactant mixture was placed under high shear agitator at 150 rpm. Separately, 431 g of 2 EHA, 11.12 g of AA, and 0.445 g n-DDM were added and mixed. The monomers were slowly added into the water-surfactant mixture by pouring into the agitator blades over 20 minutes. The resulting monomer emulsion was milky in appearance. After 25.8 g of monomer emulsion was set aside from the batch, 2.23 g of crosslinking agent, IBMA was added and mixed.

2. Preparation of Initiator Solution

The initiator solution was prepared by adding 1.14 g WAKO V-50® water soluble AIBN initiator into 40.4 g deionized water and stirring with a magnetic stirrer. The amount of V-50 is equivalent to 0.256 parts per hundred parts of a monomer (pphm).

3. Polymerization Procedure 218 g of deionized water in a 1 liter glass kettle reactor was heated by circulating hot water to 60° C. Nitrogen gas was passed into the reactor. 0.5 g V-50 was added into the reactor (equivalent to 0.112 pphm) and held for mm. 25.8 g of the monomer emulsion above (4 wt. % of monomer emulsion) was added into the reactor. With the exotherm taken into account, the batch temperature was adjusted and maintained at 60° C. After holding for 10 minutes, both the remaining monomer emulsion and initiator solution were fed slowly into the reactor in separate streams. For the monomer emulsion, the feed delay time was 180 min. (i.e., a feed rate of 3.44 g/min) and for the initiator solution, the feed delay was 210 min (a feed rate of 0.2 g/min). After all the initiator had been added, the reaction was continued for 60 minutes in order to decrease the residual monomer. 2.25 g of $NH_4OH$ (26% concentration) in 2.25 g deionized water was added to the reactor to increase the pH in order to enhance the latex shear and shelf-stability. The batch was then cooled to below 40° C. and 0.7 g of biocide (KATHON® LX, 1.5% active) was added. The total solids content was 51.4%. Residual monomer was measured using GC/MS and typically was about 0.5–1% based on the wet latex weight. The surfactant level used was 4.51 pphm.

The latices were prepared by semi-continuous emulsion polymerization using Wako V-50® AIBN initiator at 60° C. The mean particle diameters were 245±30 nm as determined by dynamic light scattering. Various latices were prepared by varying the monomeric composition as described in Table 1 to result in latices with different gel content and crosslink density.

Comparative Example
Preparation of Acrylic PSA Using Semi-Continuous Solution Polymerization 1. Preparation of Monomer Mixture The monomers were prepared by mixing 557 g of 2EHA (or BA) with 14.3 g of AA (acrylic acid) and 1.36 g of VAZO® 67 AIBN initiator using a magnetic stirrer at room temperature (RT) for 20 minutes.

2. Preparation of Catalyst Solution 70 g of toluene was mixed with 0.62 g of VAZO® 67 using magnetic stirrer at RT.

3. Polymerization Procedure 282 g of hexane was added to a 1-liter glass kettle reactor and heated to reflux at 68° C. 143 g of monomer mixture prepared above was added to the reactor and the reaction was run for 1 hour at 73° C. After 1 hour, the remaining monomer mixture was added slowly at 1.3 g/min for 30 min and then increased to 2.17 g/min for 180 min. The total monomer feed delay was 210 min. The reaction was continued for one hour after the monomer feed was completed. Catalyst solution was then added slowly over a one hour period (1.2 g/min). After addition of the catalyst solution was completed, the reaction was continued for one hour. Then, 243 g of toluene and 12.56 g of isopropanol were added as diluent. The total theoretical solids content was 48.5% and the total amount of catalyst used was 0.346 pphm. The residual monomer determined by OS/MS was 1.2% based on solution weight. Aluminum acetylacetonate (AAA) crosslinker in toluene/isopropanol 1/3/9 by weight ratio (7.7 wt. % AAA in solution) was post added to the polymer solution at 0.3–1 wt. % based on solids content to achieve the desired gel content. The mixture was placed in a roller for 3 hours to ensure even mixing prior to casting the film.

The acrylic solution PSA was prepared by semi-continuous solution polymerization using VAZO® 67 AIBN initiator at 73° C. The molecular weight averages, $M_w$ and $M_n$ of the P(2EHA-co-AA) 97.5/2.5 by weight were 259,000 and 49,400 g/mol respectively, prior to crosslinking with aluminum acetylacetonate (AAA).

PSA Testing

Emulsion PSAs were coated using wire-rod die directly onto 50 micron PET (MYLAR®) to give 30 micron dry film thickness. For solution PSAs, knife-over-roll die was used to give 30 micron dry film thickness.

Standard drying temperature of 121° C. for 10 minutes was used to dry the emulsion and solution film, unless it was otherwise indicated.

PSA testing was done at 23° C. and 50% R.H. The samples were acclimatized under these conditions for 24 hours before testing.

Loop tack and 90° peel from stainless steel and HDPE substrates were performed, according to PSTC #7 (Pressure Sensitive Tape Council Procedure No. 7). Shear holding power on stainless steel using ½ inch×½ inch PET coated strip and 500 g hanging weight according to PSTC #7.

For the loop tack test, 1 in.×8 in. (2.54×20.32 cm) strips were die cut from the PSA coated MYLAR® film. The strips were folded to form loops where on each ends, 1 in.×2 in. paper was used to cover a 1 in.×1 in. area. Hence, the total perimeter of each loop was 6 in. Stainless steel or HDPE substrates of 1 in.×6 in were mounted on the lower grip of the tensile tester and the loop was mounted on the upper grip. The upper grip holding the loop was brought into contact with the substrate using 12 in/min downward cross-head speed until the distance between the grip and the substrate reached one inch, making contact area of 1 in.×1 in. After a one second contact time, the upper grip was brought upward at 12 in/min cross head speed until detachment occurred. The maximum force of detachment was recorded as loop tack.

For the peel test, 1 in.×6 in. strips were die cut. The strips were laminated against the substrates using a 4 lb. rubber roller. After 15 minutes dwell, 90° peel off the substrate was done at 12 in/min. The average force for one inch wide tape was recorded as peel energy.

For the shear holding power test, ½ in.×½ in. strips were die cut. The strips were laminated against stainless steel using a 4 lb. rubber roller to make contact areas of ½ in.×½ in. After 15 minutes dwell time, 500 g weights were placed at the end of the strips. Automatic timers were placed below the weights to count the time of failure. Thus, shear holding power is measured as time to failure in minutes.

Viscoelastic Characterization

A Rheometrics® RDA II instrument was used to study PSA film viscoelastic properties. Dynamic mechanical analysis (DMA) measurements were done by heating the samples at 3° C./min, and by oscillating at 10 rad/s. The arrangement used were 8 mm diameter parallel plates with 1.5 mm sample thickness at the starting temperature (−80° C.). PSA films were prepared by direct coating onto siliconized paper, drying them in the oven at 121° C. for 10 minutes and plying them up to build thickness. DMA data was used to determine adhesive Tg and entanglement molecular weight ($M_e$).

Determination of Entanglement Molecular Weight ($M_e$)

Figure 2:
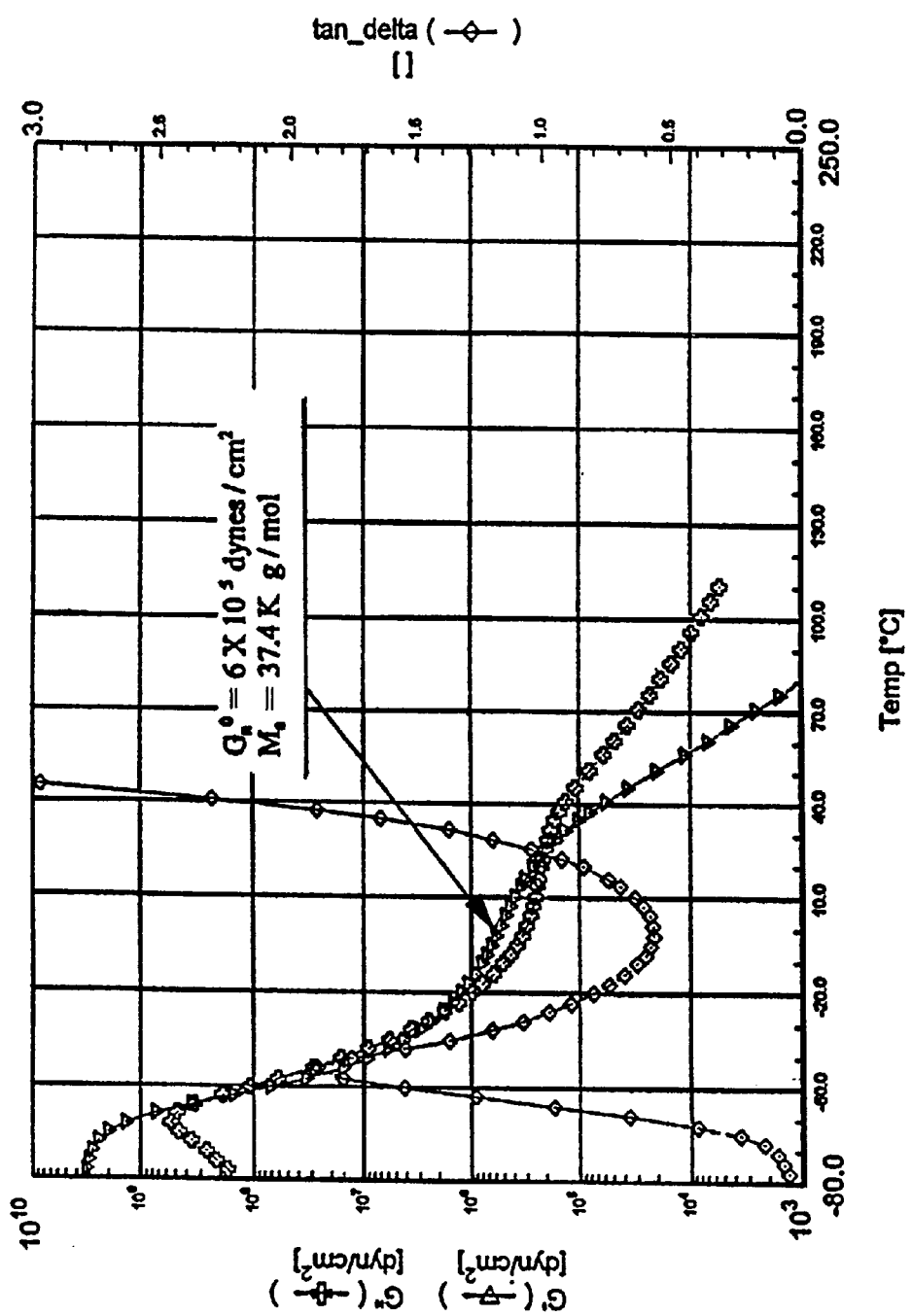
FIG. 2 shows temperature sweep DMA of monodisperse P(2-EHA).
Figure 3:
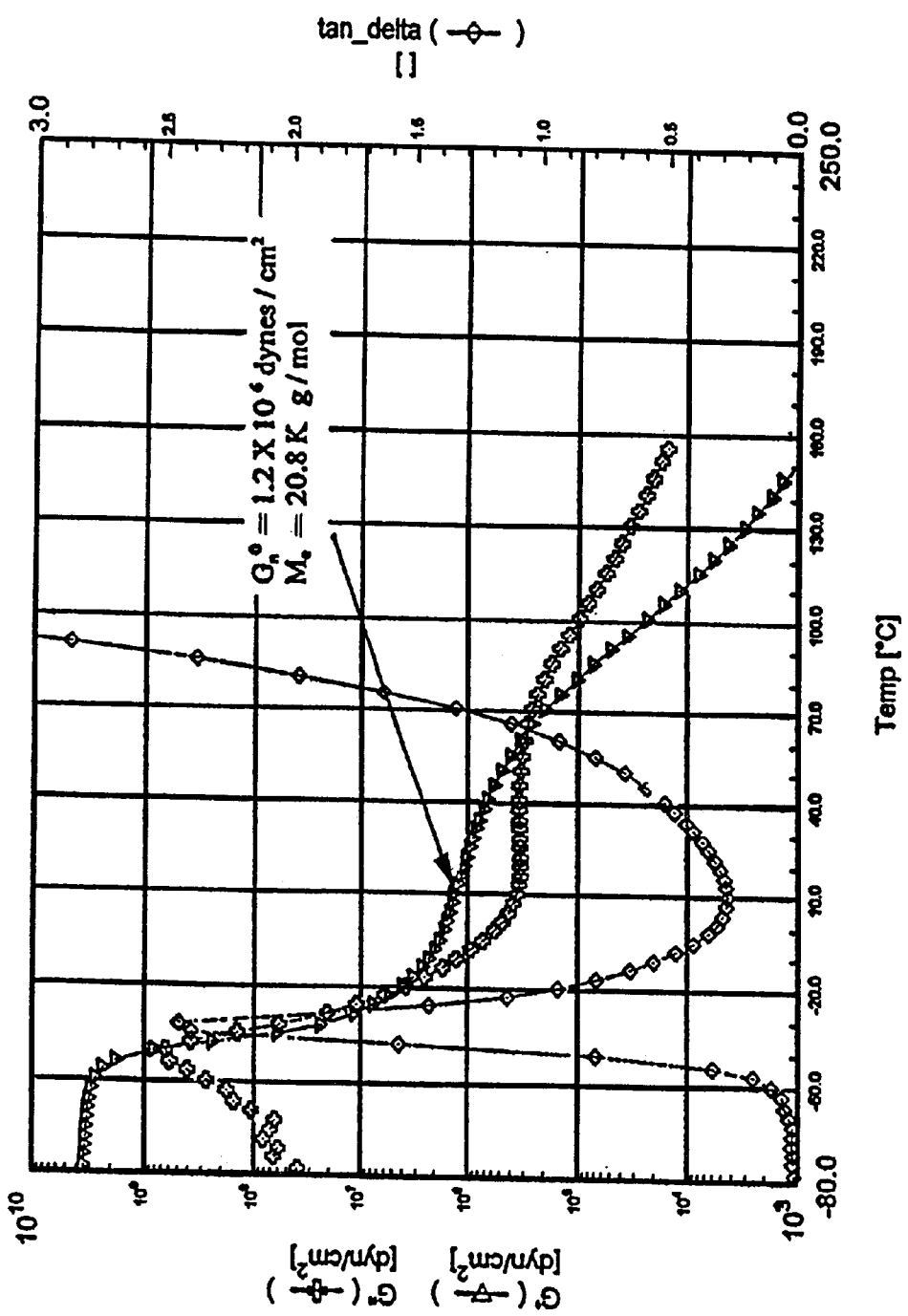
FIG. 3 shows temperature sweep DMA of monodisperse P(BA).

$M_e$ is the molecular weight of a polymer chain that is required before entangling with another polymer occurs. Calculation of $M_e$ for polydisperse sample starts from DMA characterization of monodisperse polymer. FIG. 2 shows temperature sweep DMA of monodisperse P(2-EHA). As shown in FIG. 2, $G_n^0$ could easily be determined from the location where tan δ was minimum following the prominent peak. $M_e$ could then be calculated using equation (I):

$$M_e = \frac{\rho_p RT}{G_n^0} \quad (I)$$

where $\rho_p$ is the density of polymer, R is the gas constant ($8.31 \times 10^7$ dyne-cm/mol° K) and T is the absolute temperature (° K) for the onset of rubbery plateau. Using the above equation (I), $M_e$ for monodisperse P(2-EHA) was calculated to be 37,432 g/mol. Similarly, as shown in FIG. 3, $M_e$ for P(nBA) was calculated to be 20,773 g/mol.

Knowing $M_e$ for monodisperse sample, $M_e$ for polydisperse sample could be estimated from the plasticizer model using equation (II):

$$M_{e, polydisperse} = M_{e, monodisperse}/\phi^{2.3} \quad (II)$$

Figure 4:
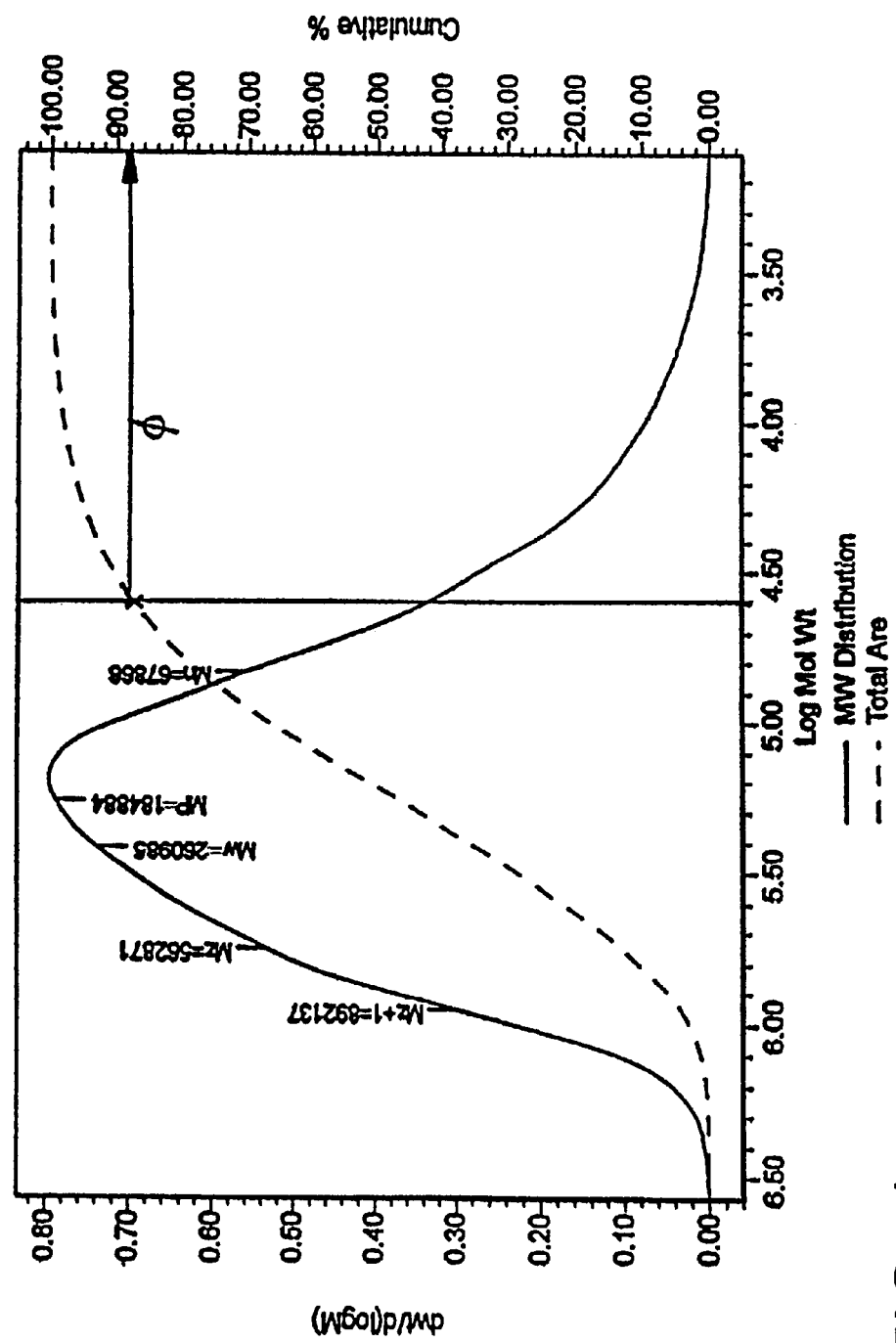
FIG. 4 shows GPC molecular weight distribution and cumulative curves of polydisperse P(2-EHA-stat-AA) 97.5/2.5 wt % made by solution polymerization.

For gel free polydisperse samples, φ could easily be determined as the weight fraction of polymer species having molecular weight greater than the $M_e$ for monodisperse sample. As shown in FIG. 4, GPC cumulative molecular weight distribution curve could be conveniently used to determine φ.

For gel containing polydisperse sample, the gel content and molecular weight between crosslink points ($M_c$) would need to be known prior to calculating φ. If the sample contains gel having $M_c > M_e$, then the gel fraction must be included as high molecular weight polymer added together with the high molecular weight fraction of the sol polymer. As will be shown later, acrylic emulsion PSAs based on P(2-EHA-co-AA) and P(BA-co-AA) contained gel of this type. On the other hand, if the sample contains gel having $M_c < M_e$, i.e., a highly crosslinked network, then the gel fraction acts as filler and therefore need not be included in calculating φ.

Figure 5:
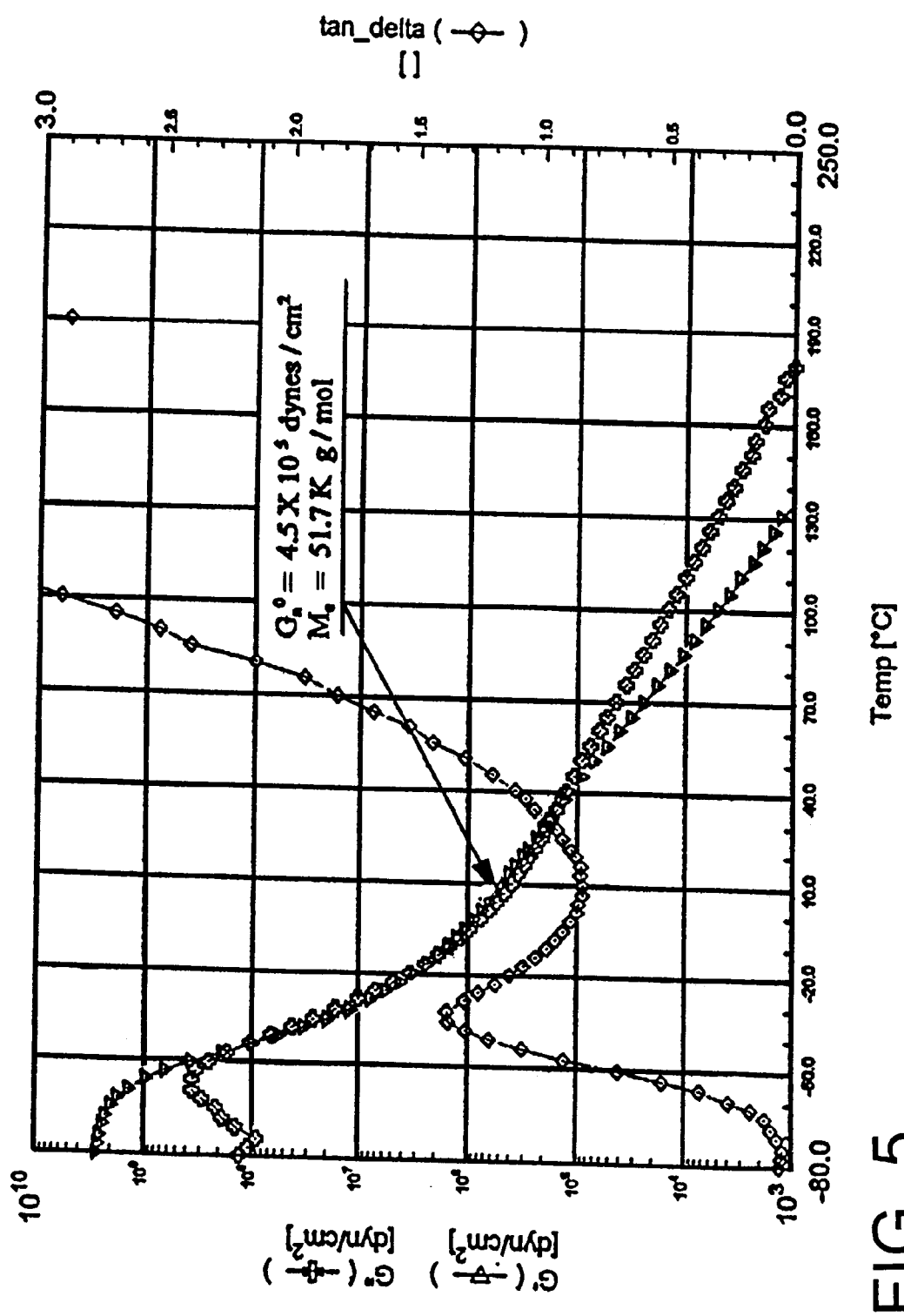
FIG. 5 shows temperature sweep DMA of polydisperse P(2-EHA-stat-AA) 97.5/2.5 wt % made by solution polymerization.

FIG. 5 shows the temperature sweep DMA of polydisperse gel free P(2-EHA-co-AA) 97.5/2.5 by weight made by solution polymerization. $M_e$ was directly calculated from the $G_n^0$ value of $4.5 \times 10^5$ dyne/cm2 using equation (I) for $M_e$. This DMA-determined $M_e$ was found to be 51,706 g/mol. The predicted $M_e$ from equation (II) using φ=0.88 from the GPC data (FIG. 4) was found to be 50,226. Hence, excellent agreement was found between the DMA-determined $M_e$ and that predicted from the plasticizer model.

Solvent Extraction and Swelling

Determination of gel content and swelling were done using membrane gel partitioning method. Unlike the Soxhlet extraction, this method does not require heat and hence it reduces the possibility of further crosslinking of the sample. For gel content determination, approximately 60 mg of adhesive film that was weighed accurately using microbalance was placed in-between two PTFE-coated papers having 10 μm pore size and 47 mm diameter. The pouch was then heat sealed and placed inside 22 ml glass scintillation vial with plastic seal cap. 15 ml of THF was added into the vial and cap sealed. The vial was tumbled slowly end-to-end for 16 hours. Triplicate samples were used. After 16 hours, the swollen pouch was dried under the hood for 3 hours and followed by oven drying at 100° C. for 2 hours. At this time the dried weight was measured. The gel content was calculated as the (dried wt./initial wt.)×100%. The THF soluble fraction was saved for GPC analysis.

Determination of $M_c$

For determination of average molecular weight between crosslink points ($M_c$), 100% insoluble material must be swollen in a solvent. In order to get adhesive gel fraction of sufficient quantity to perform the swelling experiment, 3 g of adhesive film was immersed in 300 g THF and shaken for 48 hours. The slurry was then poured through a cellulosic thimble in a Soxhlet apparatus without applying any heat to recover the gel fraction. The gel was dried at 25° C. for 24 hours under vacuum followed by drying at 40° C. for 3 hours under vacuum. About 60 mg of adhesive gel was weighed accurately and placed between PTFE coated papers having 5 μm pore size and 47 mm diameter. The pouch was heat sealed and placed in 22 ml scintillation glass vial with plastic seal cap. 15 ml of toluene was added to the vial and the sealed vial was tumbled end-to-end for 22 hours. Triplicate samples were used. After 22 hours, the swollen pouch was taken out and immersed in liquid $N_2$. The frozen pouch was weighed in a micro-balance by recording the first number that remained unchanged, i.e., when surface evaporation of liquid $N_2$ ended. The weight fraction of polymer ($W_p$) in toluene was calculated as $$W_p = \frac{\text{weight of dry gel}}{\text{weight of swollen gel}} \quad (III)$$

and the volume fraction of polymer (φ) in toluene was calculated as $$\Phi = \frac{W_p \rho_s}{W_p \rho_s + W_s \rho_p} \quad (IV)$$

where $W_s$ is the solvent weight fraction, i.e., $1-W_p$. $\rho_s$ is the density of toluene (0.8669 g/cm³) and $\rho_p$ is the density of the dry polymer. $\rho_p$=1.06 g/cm³ for P(nBA) and 0.99 g/cm³ for P(2EHA). The Flory-Rehner equation (V) was used to calculate $M_c$:

$$M_c = \frac{V_1 \rho_p [\Phi^{1/3} - \Phi/2]}{-[\ln(1-\Phi) + \Phi + X\Phi^2]} \quad (V)$$

where $V_1$ is molar volume of toluene (106.3 cm³/mol), and X is the polymer-solvent interaction parameter. If X is not known, it can be estimated from the following equation:

$$X = 0.34 + \frac{V_1}{RT}(\delta_1 - \delta_2)^2 \quad (VI)$$

where $\delta_1$ is the solubility parameter of the polymer and $\delta_2$ is the solubility parameter of toluene. The constant 0.34 is a factor which accounts for the large difference in free volume between polymer and solvent. For P(nBA), $\delta_1$=8.9 (cal/cm³)$^{1/2}$ for P/2EHA, $\delta_1$=8.6 (cal/cm³)$^{1/2}$ and $\delta_2$=8.9 (cal/cm³)$^{1/2}$ for toluene.

Molecular Weight Characterization

The THF soluble fraction from the adhesive extraction experiment described above was taken from the scintillation vials and filtered through 0.45μm TEFLON® membrane syringe filter. For solution polymerized acrylic PSAs, the solution was diluted further with THF to 0.22% solid. GPC set up with 3 columns using 5 μm polystyrene particles was used to separate molecular weights. The apparatus (Waters Alliance 2690) was equipped with refractive index detector (Waters 410) and data system (Waters Millennium 32).

Effect of $M_c$ on Adhesive Performance

The latices used in this study are shown in Table I. Molecular properties were measured on room temperature (RT) cast and dried samples in order to assess them prior to application of heat.

Emulsion 1 was essentially gel free latex made by adding 0.1 wt. % n-DDM into 2EHA/AA/IBMA monomer mixture. This latex was blended with other latices, i.e., Emulsion 2–6 which contained high level of microgels, at 100/0, 75/25, 50/50, 25/75, and 0/100 weight ratios.

Emulsion 2 was high gel containing latex made by adding 0.5 wt. % AMA (allyl methacrylate) into 2EHA/AA monomer mixture. Emulsion 2 had $M_c$<<$M_e$, i.e., a very tight network.

Emulsion 3 was high gel containing latex made by copolymerizing 2EHA/AA monomer mixture. The microgels were product of chain transfer to polymer reaction during semi-continuous emulsion polymerization. Emulsion 3 had $M_c$>$M_e$, i.e., a loose network.

Emulsion 4 was made by copolymerizing 2 wt. % PEG500-diacrylate into 2EHA/AA monomer mixture. The level of crosslinking macromonomer used here was equimolar to the AMA used in Emulsion 2. $M_e$ of Emulsion 1/Emulsion 4 blends ranged from 52,000 to 66,000 g/mol at 75/25 to 25/75 weight ratios. Therefore, these blends had $M_c$≈$M_e$.

Emulsion 5 was made by adding 0.112 parts per hundred of monomer (pphm) APS as chaser catalyst into P(2EHA-co-AA) latex during cook-out. This increases the reactivity of the microgel with the IBMA from the linear polymer (Emulsion 1) in the film when heated. IBMA reactivity increases with increasing acidity, and persulfate is more acidic than V-50® AIBN. Emulsion 5 had $M_c$>$M_e$.

Emulsion 6 was made by adding 4 wt. % AA as comonomer mixture, instead of 2.5 wt. %. Again, this increases the reactivity of the microgel with the IBMA from the linear polymer in the film when heated. Emulsion 6 had $M_c$>$M_e$.

Table 2 shows the adhesive performance of Emulsion 1/Emulsion 2 blends at 100/0, 75/25, 50/150, 25/75, and 0/100 weight ratios. The films were cast at room temperature and dried at 121° C. for 10 minutes. As expected, increasing the level of Emulsion 2 would increase the gel content and consequently the shear was increased at the expense of lowering peel and tack. The results were further clarified by

TABLE 1

Molecular Properties of Emulsion Films Cast and Dried at RT

| Emulsion Ingredients, % by wt. (Emulsion polymerized, 60° C.; V-50 ® initiator; particle size 245 ± 30 nm) | Gel Content (%) | $M_c$ (g/mol) | $M_e$* (g/mol) | $M_w$ (g/mol) | nM (g/mol) |
|---|---|---|---|---|---|
| 1: 2EHA/AA/DDM/IBMA 96.9/2.5/0.1/0.5 | 3 | — | 50K | 210K | 50K |
| 2: 2EHA/AA/AMA 97/2.5/0.5 | 94 | 17K | 154K | 80K | 18K |
| 3: 2EHA/AA 97.5/2.5 | 70 | 110K | 47K | 234K | 28K |
| 4: 2EHA/AA/PEG500-diacrylate 95.5/2.5/2 | 83 | 60K | 97K | 143K | 20K |
| 5: 2EHA/AA; 0.112 pphm APS 97.5/2.5 + APS | 80 | 110K | 42K | 269K | 36K |
| 6: 2EHA/AA 96/4 | 76 | 90K | 42K | 228K | 54K |

Figure 6:
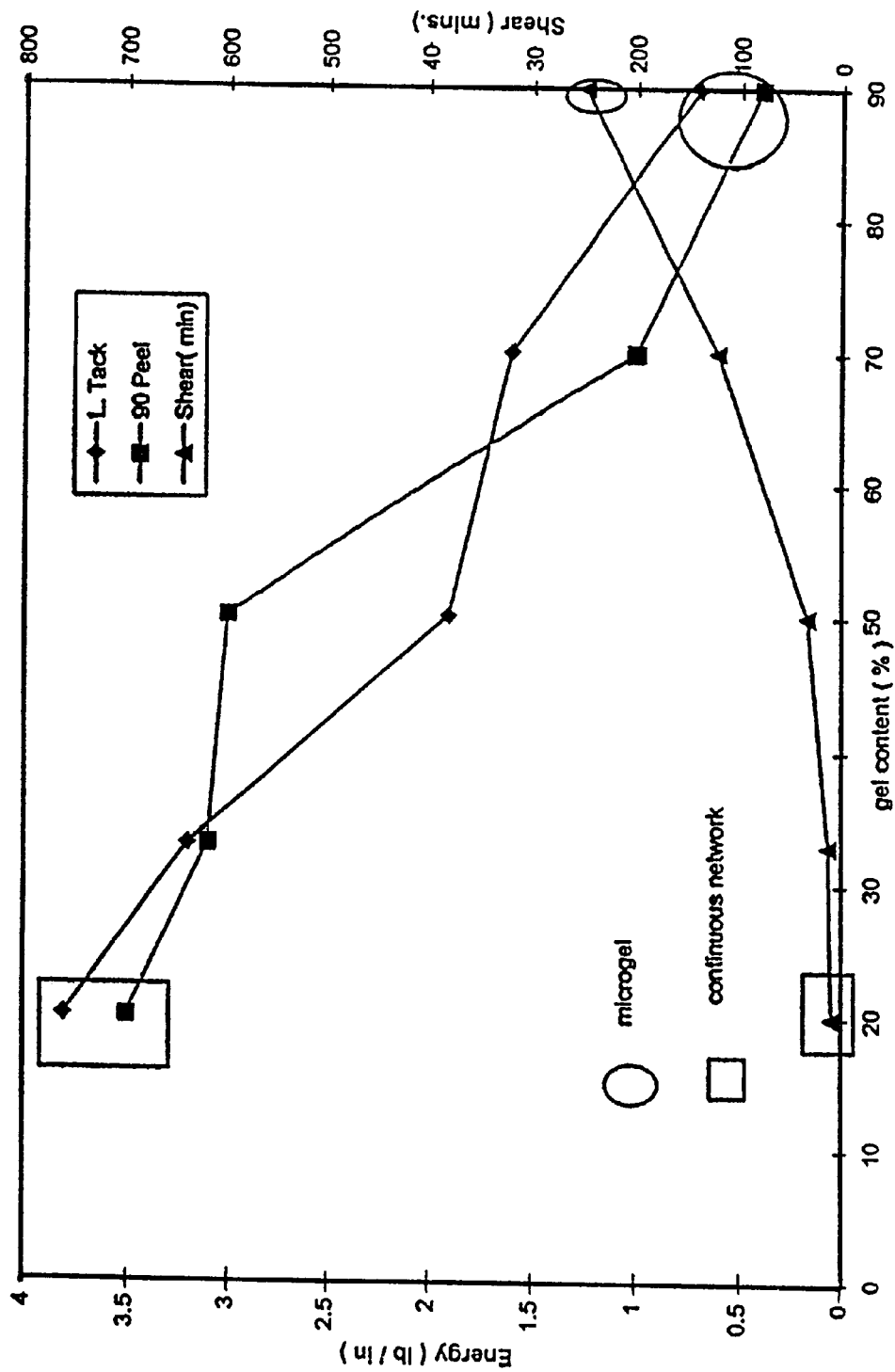
FIG. 6 is a graph of adhesive performance against gel content for a first emulsion adhesive blend.

*$M_e$ calculated from plasticizer model. (Equation II).

plotting loop tack, peel and shear from stainless steel vs. gel content as shown in FIG. 6. Since Emulsion 1 was essentially gel free at room temperature, its network morphology after drying the film at 121° C. for 10 minutes would be continuous. In contrast, Emulsion 2 contained high level of microgels which retained their morphology in the film. Emulsion 1/Emulsion 2 blends showed no synergistic effect at all compositions. As expected, since $M_c < M_e$, the linear polymer was not able to entangle with the microgels and therefore no reaction between IBMA and AA could take place.

TABLE 2

Effect of molecular weight between crosslink points ($M_c$) on adhesive performance
(PSAs were coated on 50 μm PET at 30 μm dry film thickness and dried at 121° C. for 10 minutes)
1. $M_c < M_e$

| Em. 1/ Em. 2 | Gel content (%) | L. Tack SS (lb/in) | L. Tack HDPE (lb/in) | 90° Peel SS (lb/in) | 90° Peel HDPE (lb/in) | 500 g × ½ × ½ in. Shear (min) |
|---|---|---|---|---|---|---|
| 100/0 | 20 | 3.8 | 1.7 | 3.5 | 1.3 | 9 |
| 75/25 | 33 | 3.2 | 1.5 | 3.1 | 1.2 | 12 |
| 50/50 | 50 | 1.9 | 1.3 | 3 | 0.4 | 33 |
| 25/75 | 70 | 1.6 | 0.6 | 1 | 0.3 | 122 |
| 0/100 | 90 | 0.7 | 0.5 | 0.4 | 0.2 | 250 |

Figure 7:
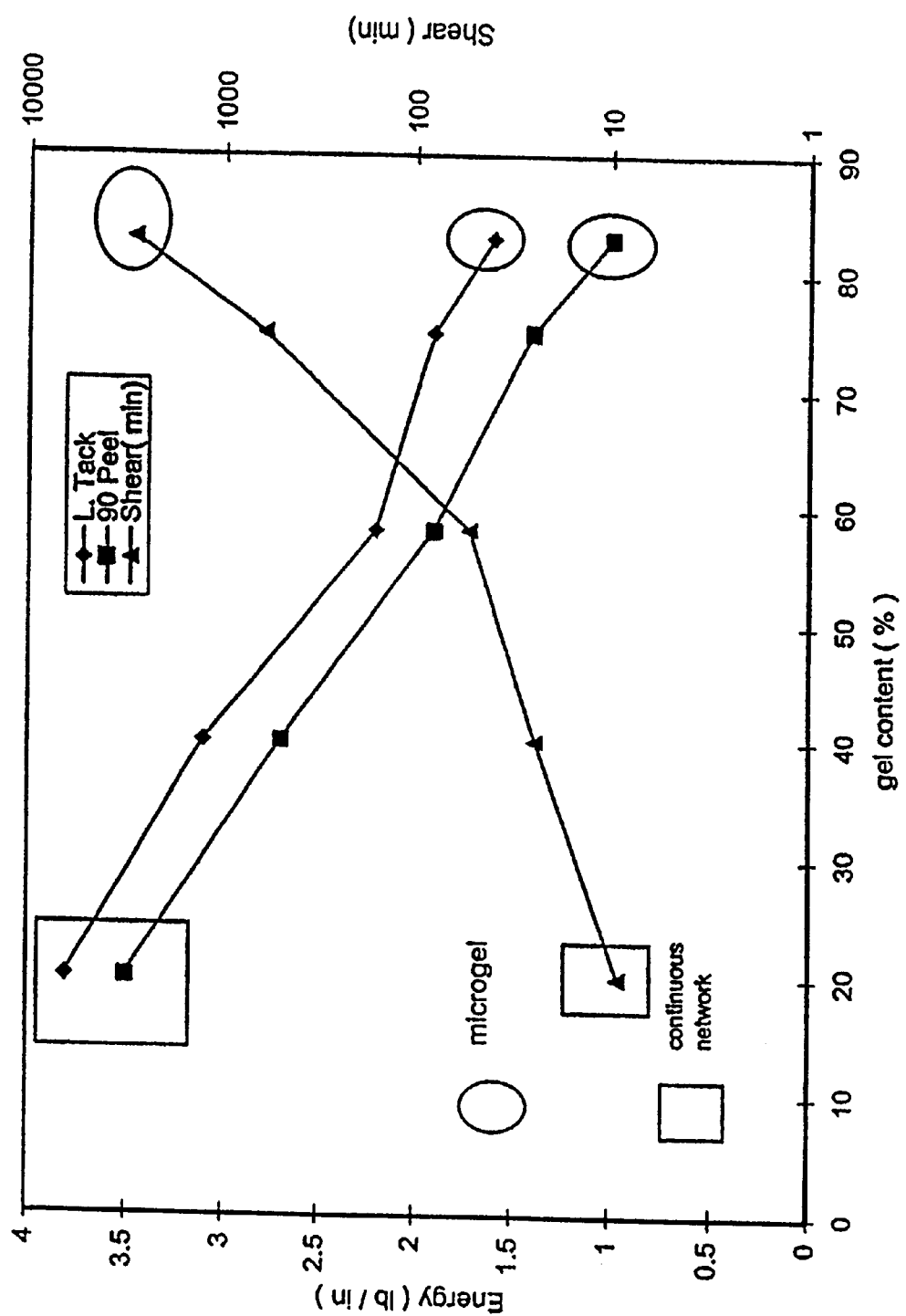
FIG. 7 is a graph of adhesive performance against gel content for a second emulsion adhesive blend.

Table 3 shows the adhesive performance of Emulsion 1/Emulsion 4 blends at the same weight ratios as above. Loop tack, peel and shear from stainless steel were plotted vs. the gel content as shown in FIG. 7. No synergistic effect was observed in these blends although the $M_c \approx M_e$. Although not wishing to be bound by theory, it appears the reason for this lack of synergism is related to the two competing reactions besides the one shown in FIG. 1. In addition to the reaction between IBMA from the linear polymer and AA from the microgels, IBMA from the linear polymer could self-crosslink and it could also crosslink with the AA from the sol fraction of the high gel containing Emulsion 4. The linear polymer had an average of 4 entanglements per molecule ($M_w/M_e \approx 4$). The microgels had taken one entanglement away from the linear polymer since its $M_c \approx M_e$. Therefore, the linear polymer still had 3 entanglements by itself which upon heating would favor self-crosslinking and the formation of a phantom network.

TABLE 3

Effect of molecular weight between crosslink points ($M_c$) on adhesive performance
(PSAs were coated on 50 μm PET at 30 μm dry film thickness and dried at 121° C. for 10 minutes)
2. $M_c \approx M_e$

| Em. 1/ Em. 4 | Gel content (%) | L. Tack SS (lb/in) | L. Tack HDPE (lb/in) | 90° Peel SS (lb/in) | 90° Peel HDPE (lb/in) | 500 g × ½ × ½ in. Shear (min) |
|---|---|---|---|---|---|---|
| 100/0 | 20 | 3.8 | 1.7 | 3.5 | 1.3 | 9 |
| 75/25 | 40 | 3.1 | 1.4 | 2.7 | 1.2 | 24 |
| 50/50 | 58 | 2.2 | 1.1 | 1.9 | 0.9 | 52 |
| 25/75 | 75 | 2 | 0.9 | 1.4 | 0.7 | 614 |
| 0/100 | 83 | 1.6 | 0.7 | 1 | 0.6 | 2900 |

Figure 8:
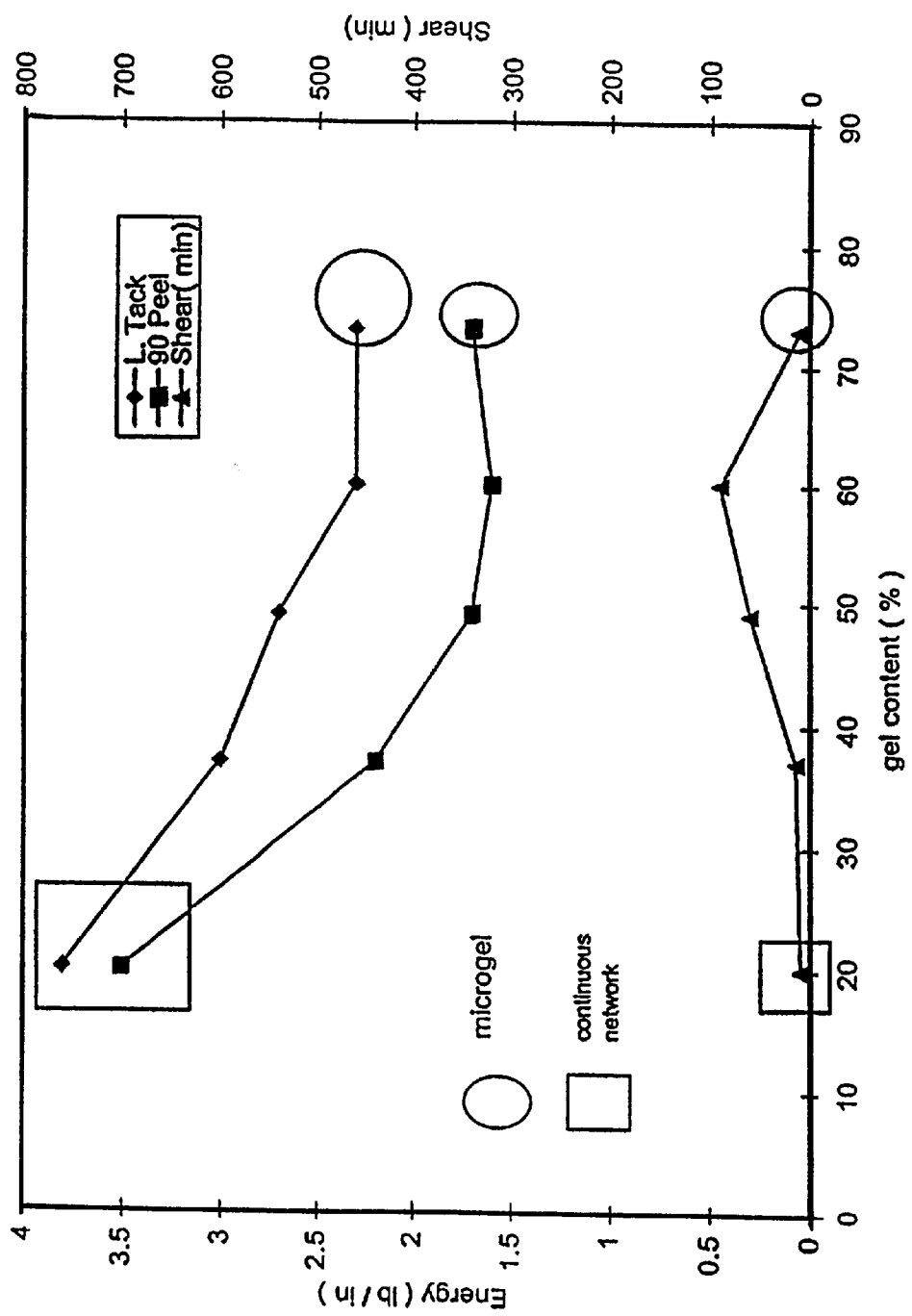
FIG. 8 is a graph of adhesive performance against gel content for a third emulsion adhesive blend.
Figure 9:
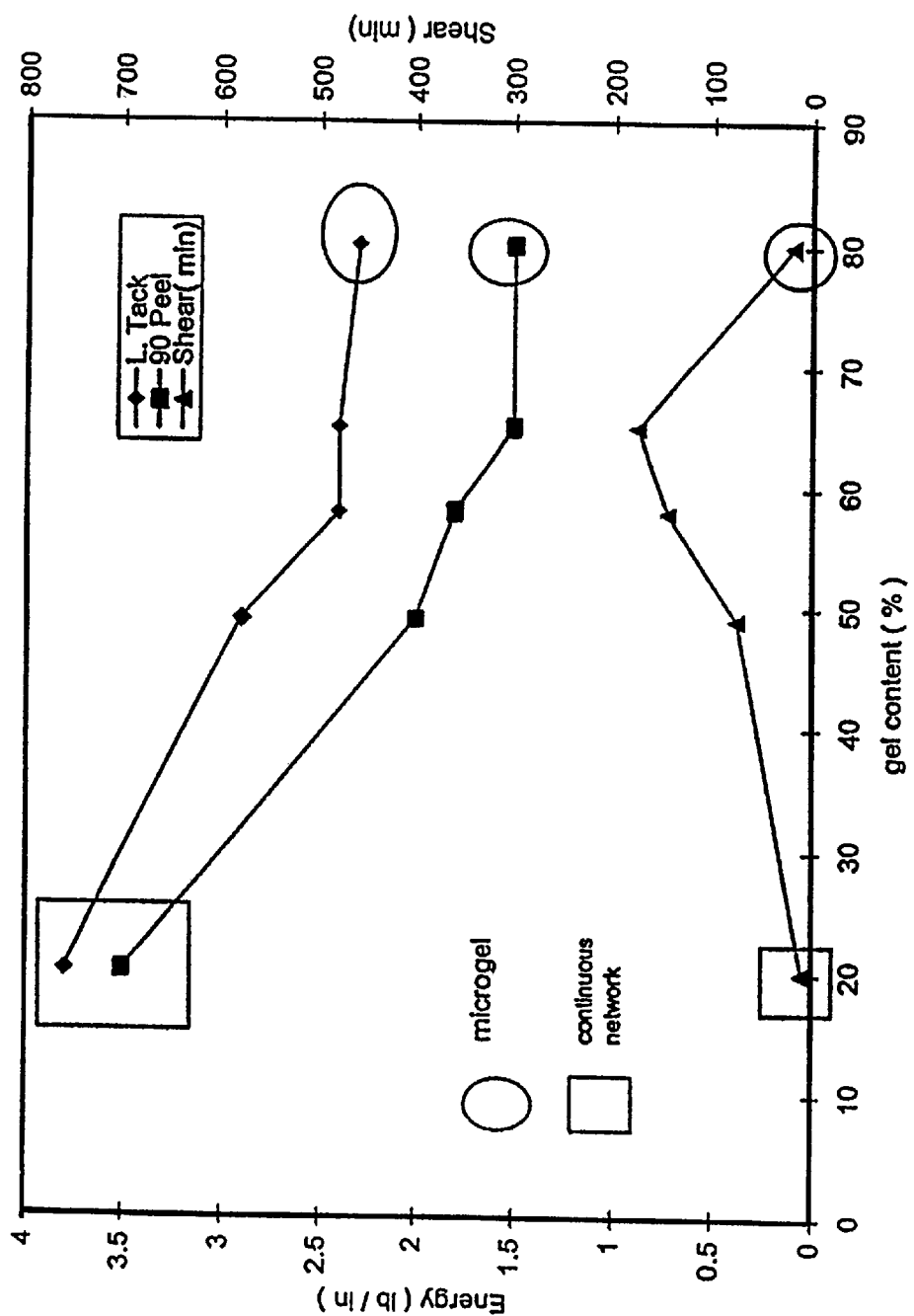
FIG. 9 is a graph of adhesive performance against gel content for a fourth emulsion adhesive blend.

Table 4 shows the adhesive performance of Emulsion 1/Emulsion 3 at the same weight ratios as above. Loop tack, peel and shear from stainless steel were plotted vs. the gel content in FIG. 8. With $M_c > M_e$; precisely $M_c \approx 2 M_e$, the microgels started to react with the linear polymer and mild synergism in shear was obtained as shown in FIG. 8. The blends at 50/50 and 25/75 Emulsion 1/Emulsion 3 weight ratios had higher shear than either one of the constituents. In essence, with $M_c/M_e \approx 2$ and $M_w M_e \approx 2$, the microgels had the same probability of reaction with the linear polymer vs. the other two competing reactions mentioned above.

TABLE 4

Effect of molecular weight between crosslink points ($M_c$) on adhesive performance
(PSAs were coated on 50 μm PET at 30 μm dry film thickness and dried at 121° C. for 10 minutes)
3. $M_c > M_e$

| Em. 1/ Em. 3 | Gel content (%) | L. Tack SS (lb/in) | L. Tack HDPE (lb/in) | 90° Peel SS (lb/in) | 90° Peel HDPE (lb/in) | 500 g × ½ × ½ in. Shear (min) |
|---|---|---|---|---|---|---|
| 100/0 | 20 | 3.8 | 1.7 | 3.5 | 1.3 | 9 |
| 75/25 | 37 | 3 | 1.6 | 2.2 | 1.2 | 14 |
| 50/50 | 49 | 2.7 | 1.3 | 1.7 | 1.1 | 60 |
| 25/75 | 60 | 2.3 | 1.3 | 1.6 | 1 | 90 |
| 0/100 | 73 | 2.3 | 1 | 1.7 | 0.9 | 11 |

Effect of Microgel Reactivity on Adhesive Performance

Table 5 shows adhesive performance of Emulsion 1/Emulsion 5 blends at the same weight ratios as above. Emulsion 5 had $M_c > M_e$, the same composition as that of Emulsion 3, but with 0.112 pphm APS added as chaser catalyst. Since APS was added during cook-out, it is hypothesized that most would be located near the particle surface. As shown in FIG. 5, increased synergistic effect in shear over that found in Emulsion 1/Emulsion 3 blends was observed. Thus, covalently interlinking the microgels significantly increases the shear.

TABLE 5

Effect of microgel reactivity on adhesive performance
(PSAs were coated on 50 μm PET at 30 μm dry film thickness and dried at 121° C. for 10 minutes)
4. $M_c > M_e$ and 0.112 pphm APS was added as chaser catalyst

| Em. 1/ Em. 5 | Gel content (%) | L. Tack SS (lb/in) | L. Tack HDPE (lb/in) | 90° Peel SS (lb/in) | 90° Peel HDPE (lb/in) | 500 g × ½ × ½ in. Shear (min) |
|---|---|---|---|---|---|---|
| 100/0 | 20 | 3.8 | 1.7 | 3.5 | 1.3 | 9 |
| 75/25 | 49 | 2.9 | 1.6 | 2 | 1.2 | 75 |
| 50/50 | 58 | 2.4 | 1.4 | 1.8 | 1 | 144 |
| 25/75 | 65 | 2.4 | 1.2 | 1.5 | 0.9 | 175 |
| 0/100 | 80 | 2.3 | 1.2 | 1.5 | 0.8 | 20 |

Figure 10:
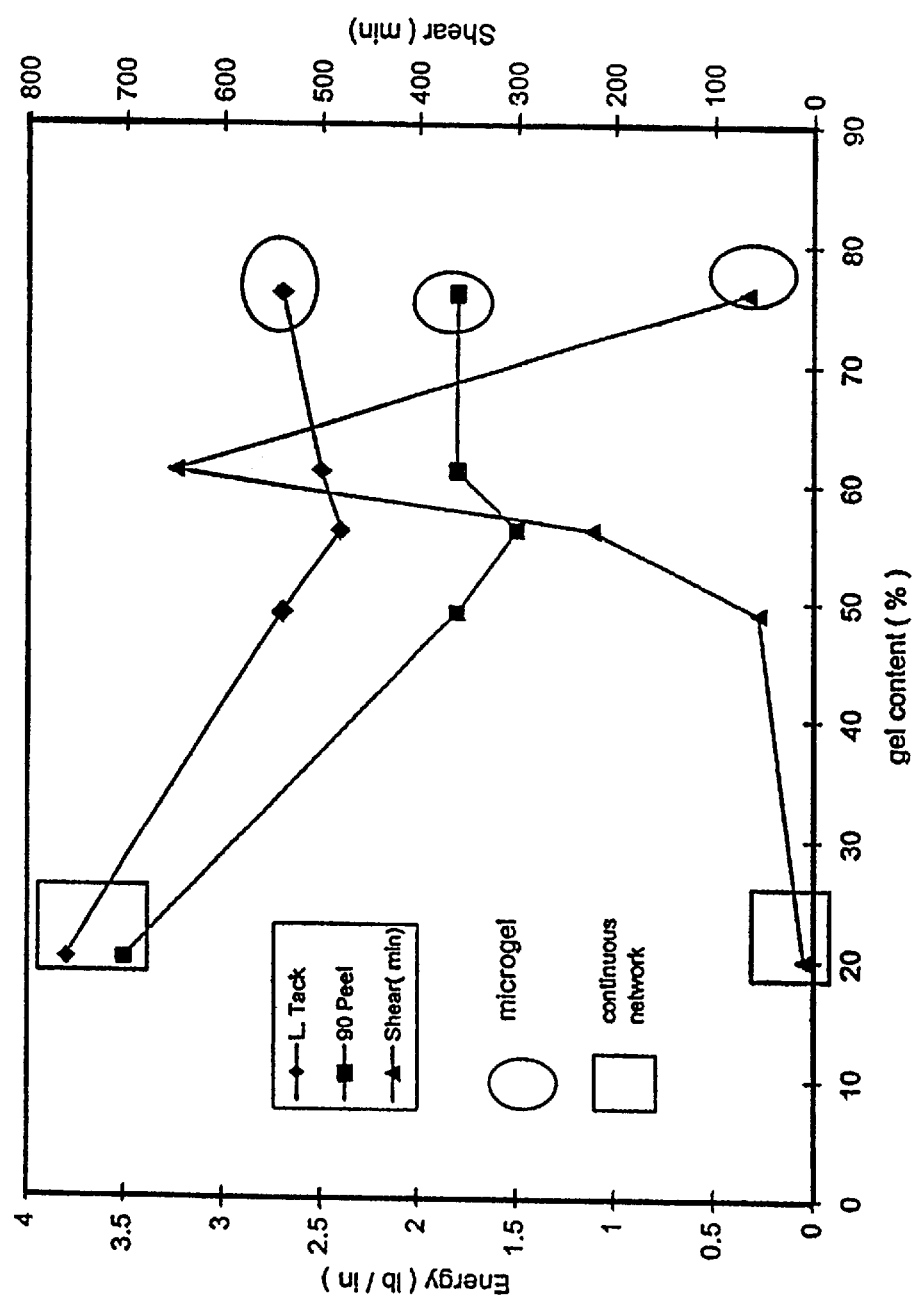
FIG. 10 is a graph of adhesive performance against gel content for a fifth emulsion adhesive blend.

Another means of increasing the microgel reactivity is by increasing the level of AA in the copolymer. Table 6 shows the adhesive performance of Emulsion 1/Emulsion 6 blends at the same weight ratios as above. Loop tack, peel and shear from stainless steel were plotted against the gel content for adhesive films cast at room temperature and dried at 121° C. for 10 minutes in FIG. 10. Very strong synergistic effect in shear was observed. At 25/75 Emulsion 1/Emulsion 6 weight ratio, the PSA had shear of 10 times higher than that of Emulsion 6 and 72 times higher than that of Emulsion I. This result confirms that covalently interlinking the microgels with the linear polymer increases shear.

TABLE 6

Effect of microgel reactivity on adhesive performance
(PSAs were coated on 50 μm PET at 30 μm dry
film thickness and dried at 121° C. for 10 minutes)
5. $M_c$ and $M_e$ AA level used was 4% instead of 2.5%

| Em. 1/ Em. 6 | Gel content (%) | L. Tack SS (lb/in) | L. Tack HDPE (lb/in) | 90° Peel SS (lb/in) | 90° Peel HDPE (lb/in) | 500 g × ½ × ½ in. Shear (min) |
|---|---|---|---|---|---|---|
| 100/0 | 20 | 3.8 | 1.7 | 3.5 | 1.3 | 9 |
| 75/25 | 49 | 2.7 | 1.5 | 1.8 | 1.1 | 55 |
| 50/50 | 56 | 2.4 | 1.7 | 1.5 | 0.8 | 223 |
| 25/75 | 61 | 2.5 | 1.5 | 1.8 | 0.8 | 648 |
| 0/100 | 76 | 2.7 | 1.4 | 1.8 | 0.8 | 67 |

Adhesive Performance of Emulsion Blends vs. Single Emulsion vs. Solvent Borne Acrylic PSAs Table 7 shows adhesive performance of the emulsion blend vs. single emulsion system vs. solvent borne acrylic PSAs. The emulsion blend was 25/75 Emulsion 1/Emulsion 6. The single emulsion system was P(2-EHA-co-AA-co-IBMA) 97/2.5/0.5 by weight synthesized by semi-continuous emulsion polymerization using Wako V-50® AIBN initiator at 60° C. The solvent borne acrylic was P(2EHA-co-AA) 97.5/2.5 by weight crosslinked by post addition of 0.75 wt. % aluminum acetylacetonate (AAA). These results demonstrate that the inventive adhesives exhibit performance characteristics comparable to solvent borne PSAs.

TABLE 7

Adhesive performance of emulsion blend vs. emulsion vs. solvent borne acrylic PSAs

| Adhesive | Gel content (%) | L. Tack SS (lb/in) | L. Tack HDPE (lb/in) | 90° Peel SS (lb/in) | 90° Peel HDPE (lb/in) | 500 g × ½ × ½ in. Shear (min) |
|---|---|---|---|---|---|---|
| Neat | | | | | | |
| Em. 1/ Em. 6 (25/75) | 61 | 2.5 | 1.5 | 1.8 | 0.8 | 648 |
| Emulsion[1] | 70 | 2 | 1.2 | 1.2 | 0.7 | 400 |
| Solvent Borne[2] | 69 | 2.1 | 1.3 | 1.1 | 0.5 | 337 |
| 15 wt. % tackifier | | | | | | |
| Em. 1/ Em. 6 (25/75) | 61 | 3.5 | 2.0 | 2 | 1.3 | 70 |
| Emulsion[1] | 70 | 2.6 | 1.4 | 1.6 | 0.9 | 250 |
| Solvent Borne[2] | 61 | 4.6 | 1.5 | 2.8 | 1.1 | 119 |

[1]2EHA/AA/IBMA 97/2.5/0.5
[2]2EHA/AA 97.5/2.5 with 0.75% Al Acetyl Acetonate

Effect of Gel Content on Adhesive Performance

While molecular weight ($M_w$) and molecular weight between entanglements ($M_e$) affect peel and loop tack properties of acrylic PSAs, gel content and network morphology have more pronounced effect on shear holding power.

As shown in Table 8, coated PSAs based on emulsion and solution polymerized acrylic polymers show a dramatic decrease in shear holding power as the gel content is decreased. This is independent of the method of polymerization, i.e., solvent or emulsion. Shear holding power (T) is directly proportional to zero shear viscosity as given by the following equation $$T = \frac{L^2 w \eta}{2tMg}$$

where T is time to failure, L is length of overlap, W is the width of the tape, η is zero shear viscosity, t is the adhesive thickness, M is the load, and g is the gravitational constant. With everything else being constant, therefore, shear holding power (T) is directly influenced by the level of crosslinking (gel content), network morphology and entanglement.

TABLE 8

Effect of gel content on Adhesive properties.
(PSAs were coated on 50 μm PET film at 30 μm dry film thickness)

| Gel content (%) | $M_c$ (g/mol) | $M_w$ (g/mol) | $M_n$ (g/mol) | $M_e$ (g/mol) | L. Tack SS (N/m) | L. Tack HDPE (N/m) | 90° Peel SS (N/m) | 90° Peel HDPE (N/m) | 4.9N × 1.27 × 1.27 cm Shear (Min) |
|---|---|---|---|---|---|---|---|---|---|
| 1. P(2EHA-stat-AA) 97.5/2.5 Emulsion | | | | | | | | | |
| 77 | 53K | 142K | 38K | 42K | 368 | 228 | 228 | 93 | 27 |
| 32 | 51K | 124K | 32K | 63K | 614 | 421 | 684 | 175 | 2.4 |
| 2. P(BA-stat-AA) 97.5/2.5 Emulsion | | | | | | | | | |
| 79 | 80K | 257K | 46K | 21K | 316 | 175 | 158 | 70 | 70 |
| 52 | 80K | 230K | 60K | 21K | 386 | 228 | 210 | 88 | 14 |
| 3. P(2EHA-stat-AA) 97.5/2.5 Solution | | | | | | | | | |
| 71 | 61K | 70K | 24K | 50K | 228 | 175 | 105 | 53 | 761 |
| 27 | 65K | 240K | 47K | 54K | 824 | 316 | 719 | 193 | 25 |

TABLE 8-continued

Effect of gel content on Adhesive properties.
(PSAs were coated on 50 μm PET film at 30 μm dry film thickness)

| Gel content (%) | $M_c$ (g/mol) | $M_w$ (g/mol) | $M_n$ (g/mol) | $M_e$ (g/mol) | L. Tack SS (N/m) | L. Tack HDPE (N/m) | 90° Peel SS (N/m) | 90° Peel HDPE (N/m) | 4.9N × 1.27 × 1.27 cm Shear (Min) |
|---|---|---|---|---|---|---|---|---|---|
| \multicolumn{10}{c}{4. P(BA-stat-AA) 97.5/2.5 Solution} |
| 80 | 63K | 79K | 30K | 23K | 246 | 123 | 105 | 53 | 5000 |
| 40 | 63K | 230K | 61K | 23K | 439 | 140 | 333 | 53 | 250 |

In all cases, P(BA-co-AA) compositions show higher shear holding power compared to that of P(2-EHA-co-AA) regardless of the method of polymerization. This effect is due to higher $M_w/M_e$ ratio in P(BA-co-AA) as discussed previously. It is also clear that as the gel content was decreased, the peel and loop tack were increased in both acrylic solution and emulsion PSAs. Uncrosslinked polymers having broad polydispersity (PDI 3.5–5.5) were effective in providing high viscoelastic energy dissipation during debonding. In contrast, network is considered elastic and does not dissipate high viscoelastic energy during debonding.

In addition, network morphology plays significant role in influencing the shear holding power as well as its balance with peel and loop tack. As shown in Table 8, shear holding power of solution acrylic PSAs are 1 to 2 orders of magnitude higher than that of the emulsions. As mentioned previously, microgels were formed during semi-continuous emulsion polymerization of 2-EHA and BA and their morphology could be retained after film formation. In contrast, solvent borne acrylic started with gel free composition, which, following solvent evaporation, would start to undergo crosslinking in the film due to reaction between the acrylic acid and Al acetyl acetonate. Although not wishing to be bound by theory, it is hypothesized that the resulting network morphology would be continuous. In short, discrete network morphology found in acrylic emulsion PSA gave much lower shear compared to continuous network morphology found in acrylic solution PSA.

Effect of Network Morphology on Adhesive Performance

Network morphology plays significant role in influencing shear holding power and its balance with peel and loop tack properties in acrylic PSAs. In the following, the formation of network in the film state as a result of the reactions of IBMA in the film due to heating the film is disclosed. It is well known that under high temperature (ca. 175° C.), IBMA can undergo self crosslinking reaction as well as reaction with carboxylic acid to produce network polymer and isobutanol. The high temperature requirement is generally necessary if one is to start with linear polymer and build the whole network after film formation and heating. However, as it will be shown later, IBMA reactions can occur at significantly lower temperature such as 121° C. if all that is needed is to connect the microgels by forming grafting with the linear polymer provided that the molecular weight of the linear polymer is sufficiently high to form entanglements with the microgels. As it will be shown later, this is very effective in increasing shear holding power without adverse effect in peel and loop tack. The IBMA level used herein was between 0.5–1 wt. % of the total monomer in order not to increase the crosslink density significantly.

FIG. 11 shows the schematic morphology of network formation in the emulsion film as a result of IBMA reactions due to heating the film. Four cases are considered in the following. In case 1, uncrosslinked acrylic polymer with IBMA functionality was heated and the result was continuous network with lower molecular weight species trapped inside as plasticizer and outside the network. In case 2, microgel-containing acrylic polymer with IBMA functionality was heated and the result was interconnection of these microgels by the linear polymer provided that $M_w \geq 2 M_e$ for the linear polymer and $M_c > M_e$ for the microgel. In case 3, these microgels were not interconnected by the linear polymer because $M_w < 2M_e$. An example of case 3 would be the tackified system where tackifier addition increased $M_e$ so that the linear polymer now was too short to entangle with the microgels. In case 4, these microgels were not interconnected by the linear polymer because $M_w > 20 M_e$. A schematic drawing of each of these four cases is shown in FIG. 12. Due to dense entanglement, the linear polymer would kinetically be hindered from diffusing and forming interconnection with the microgels when heated. Hypothetically, the linear polymer chains with such high molecular weight would effectively form their own "phantom" network instead.

Tables 9–13 show examples of the four cases mentioned above. In each case, control examples were given by showing the molecular properties and adhesive performance of acrylic PSAs having the same compositions, but, without IBMA. The purpose is to show the impact of various types of network morphology on adhesive performance.

In case 1, heating the gel free acrylic PSAs at 121° C. for 10 minutes followed by 150° C. for 10 minutes was necessary in order to make a network. Heating at 121° C. for 10 minutes alone was not sufficient to form a network. As shown in Table 9, shear holding power of sample 1 and 2 were significantly increased upon heating and loop tack and peel were decreased. The loop tack and peel were lower than the control (sample 3) although the gel content was lower. This means that continuous network morphology was more rigid than microgels which lowered viscoelastic energy dissipation during debonding. The finding is further corroborated by the result shown in Table 8 where solvent borne acrylics with high gel content (70–80%) had lower loop tack and peel compared to those of emulsions. As discussed previously, solvent borne acrylic mechanism of crosslinking by Al acetyl acetonate (AAA) led to continuous network in the film.

TABLE 9

Network formation in the film
Case 1

| Sample | Drying Condition | Gel (%) | $M_w$ (g/mol) | $M_n$ (g/mol) | $M_e$ (g/mol) | $M_c$ (g/mol) | L Tack SS (N/m) | L. Tack HDPE (N/m) | 90° Peel SS (N/m) | 90° Peel HDPB (N/m) | Shear 4.9N × 1.27 × 1.27 cm Shear (Min) |
|---|---|---|---|---|---|---|---|---|---|---|---|
| 1 | room temp | 3 | 209K | 50K | 50K | — | 965 | 298 | 631 | 211 | 1.3 |
| 1 | 121° C., 10 min 150° C., 10 min | 68 | 153K | 50K | 43K | 144K | 298 | 281 | 140 | 105 | 140 |
| 2 | room temp | 1 | 169K | 31K | 62K | — | 824 | 702 | 351 | 351 | 0.3 |
| 2 | 121° C., 10 min 150° C., 10 min | 54 | 120K | 30K | 60K | 77K | 211 | 175 | 88 | 88 | 117 |
| 3 | 121° C., 10 min | 78 | 148K | 32K | 42K | 54K | 368 | 228 | 228 | 105 | 27 |

1: 2EHA/AA/IBMA/DDM 96.9/2.5/0.5/0.1 initiated by WAKO V-50 at 60° C.
2: 2EHA/AA/IBMA/DDM 96.3/2.5/1/0.2 initiated by WAKO V-50 at 60° C.
3: Control (microgels formed during polymerization and no additional x-linking after drying), 2EHA/AA 97.5/2.5, initiated by KPS at 80° C.

In case 2, IBMA was present both in the microgels and in the linear polymers. Examples of both P(2-EHA-co-AA) and P(BA-co-AA) are shown in Tables 10 and 11, respectively. In all examples, the linear polymers were able to form interlinks with the microgels because their $M_w \geq 2 M_e$. A significant increase in shear holding power was obtained after heating the film at 121° C. for 10 minutes. Table 10 shows the molecular properties and adhesive performance of P(2-EHA-co-AA) based polymers while those of P(BA-co-AA) based polymers are shown in Table 11. Closer examination reveals that minimal impact on peel reduction was obtained when the PSA had a small increase in gel content after heating at 121° C. for 10 minutes compared to that dried at room temperature (e.g., sample 2). This might be due to the fact that grafting the microgels by the linear polymer took place without forming continuous network as described in case 1. There are two observations which can be made from the data of Table 10 and 11. First, reactions of IBMA can take place at lower temperature compared to that in case 1. While not wishing to be bound by theory, it is hypothesized that linking the microgels only needed a few crosslink points in contrast to building the whole network that needed many crosslink points. Second, for both P(2-EHA-co-AA) and P(BA-co-AA), addition of 15 wt. % tackifier still shows high shear holding power with an increase in loop tack and peel. That is to say that tackifier did not interfere with the ability of the linear polymer to interlink the microgels as long as $M_w \geq 2 M_e$ prior to heating the film.

TABLE 10

Network formation in the film
Case 2

| Sample | Drying Condition | Gel (%) | $M_w$ (g/mol) | $M_n$ (g/mol) | $M_e$ (g/mol) | $M_c$ (g/mol) | L Tack SS (N/m) | L. Tack HDPE (N/m) | 90° Peel SS (N/m) | 90° Peel HDPB (N/m) | Shear 4.9N × 1.27 × 1.27 cm Shear (Min) |
|---|---|---|---|---|---|---|---|---|---|---|---|
| 1 | room temp | 54 | 124K | 31.7K | 56K | 80K | 368 | 316 | 256 | 105 | 8.4 |
| 1 | 121° C., 10 min | 67 | 118K | 36K | 50K | 72K | 211 | 228 | 123 | 88 | 383 |
| 2 | room temp | 65 | 245K | 32K | 40K | 117K | 351 | 211 | 163 | 70 | 20 |
| 2 | 121° C., 10 min | 75 | 210K | 25K | 43K | 61K | 351 | 228 | 165 | 123 | 400 |
| 3 | 121° C., 10 min | 73 | 210K | 25K | 57K | 61K | 509 | 316 | 235 | 123 | 250 |
| 4 | 121° C., 10 min | 78 | 148K | 32K | 42K | 54K | 368 | 228 | 205 | 88 | 27 |
| 5 | 121° C., 10 min | 78 | 148K | 32K | 61K | 54K | 439 | 316 | 237 | 116 | 15 |

1: 2EHA/AA/IBMA/DDM 96.4/2.5/1/0.1 initiated by KPS at 80° C.
2: 2EHA/AA/IBMA 97/2.5/0.5 Initiated by Wako V-50 at 60° C.
3: same as (2) with 15 wt % tackifier. Only $M_w$ of polymer reported.
4: Control (microgel: formed during polymerization and no additional X-linking after drying), 2EHA/AA 97.5/2.5. KPS initiated at 80° C.
5: Control with 15% tackifier.

TABLE 11

Network formation in the film
Case 2 (continued)

| Sample | Drying Condition | Gel (%) | $M_w$ (g/mol) | $M_n$ (g/mol) | $M_e$ (g/mol) | $M_c$ (g/mol) | L Tack SS (N/m) | L. Tack HDPE (N/m) | 90° Peel SS (N/m) | 90° Peel HDPB (N/m) | Shear 4.9N × 1.27 × 1.27 cm Shear (Min) |
|---|---|---|---|---|---|---|---|---|---|---|---|
| 1 | room temp | 45 | 188K | 36K | 25K | 143K | 193 | 70 | 246 | 53 | 50 |
| 1 | 121° C., 10 min | 77 | 100K | 30K | 23K | 76K | 211 | 88 | 123 | 70 | 1100 |
| 2 | room temp | 45 | 188K | 36K | 36K | 143K | 316 | 175 | 316 | 123 | 23 |
| 2 | 121° C., 10 min | 77 | 1000K | 30K | 40K | 90K | 386 | 281 | 211 | 105 | 995 |
| 3 | 121° C., 10 min | 79 | 257K | 45K | 21K | 80K | 316 | 175 | 158 | 70 | 70 |
| 4 | 121° C., 10 min | 79 | 257K | 45K | 31K | 80K | 433 | 228 | 211 | 88 | 55 |

1: BA/AA/IBMA/DDM 96.4/2.5/1/0.1, KPS initiated at 80° C.
2: Same as (1) with 15 wt. % tackifier. MWD is bimodal. Only $M_w$ of polymer reported.
3: Control (microgels formed drying polymerization and no additional X-linking after drying), BA/AA 97.5/2.5, KPS initiated at 80° C.
4: Control with 15% tackifer. Only $M_w$ of polymer is reported.

In contrast to case 2, case 3 shows example where the linear polymer was unable to link the microgels because $M_w<2 M_e$. Table 12 shows an example where the addition of tackifier cause $M_w<2 M_e$ for the linear polymer. In this case, as expected, the improvement in shear holding power was small.

TABLE 12

Network formation in the film
Case 3

| Sample | Drying Condition | Gel (%) | $M_w$ (g/mol) | $M_n$ (g/mol) | $M_e$ (g/mol) | $M_c$ (g/mol) | L. Tack SS (N/m) | L. Tack HDPB (N/m) | 90° C. Peel SS (N/m) | 90° C. Peel HDPE (M/m) | Shear 4.9N × 1.27 × 1.27 cm (Min) |
|---|---|---|---|---|---|---|---|---|---|---|---|
| 1 | room temp | 54 | 124K | 31.7K | 81K | 80K | 596 | 386 | 403 | 172 | 7 |
| 1 | 121° C., 10 min | 67 | 118K | 36K | 70K | 58K | 386 | 281 | 281 | 160 | 48 |
| 2 | 121° C., 10 min | 78 | 148K | 32K | 61K | 54K | 439 | 316 | 246 | 105 | 15 |

1: 2EHA/AA/IBMA/DDM 96.4/2.5/1/0.1, KPS inidated with 15 wt. % tackifier. Only $M_w$ of polymer reported.
2: Control (2EHA/AA 97.5/2.5, KPS initiated) with 15 wt. % tackifier. Microgels formed curing polymerization. Only $M_w$ of polymer reported.

The opposite from case 3 is when the linear polymer was too long, i.e., $M_w \geq 20 M_e$, which is case 4. Table 13 shows examples of case 4. Since the molecular weight was very high, loop tack and peel were significantly lower than those shown in Table 11 for similar compositions. Surprisingly, such very high molecular weight linear polymer, although after heating showed increase in shear, the increase was still smaller than that given by linear polymers having medium molecular weight such as those shown in Table 11. Although not wishing to be bound by theory, it is postulated that formation of phantom network was a result of self crosslinking of the linear polymer without interlinking the microgels. It is possible that due to dense entanglement, the linear polymer would tend to stay together and formed crosslinking rather than diffusing and reacting with the microgels because it was kinetically more favorable.

TABLE 13

Network formation in the film
Case 4

| Sample | Drying Condition | Gel (%) | $M_w$ (g/mol) | $M_n$ (g/mol) | $M_e$ (g/mol) | $M_c$ (g/mol) | L. Tack SS (N/m) | L. Tack HDPB (N/m) | 90° C. Peel SS (N/m) | 90° C. Peel HDPE (M/m) | Shear 4.9N × 1.27 × 1.27 cm (Min) |
|---|---|---|---|---|---|---|---|---|---|---|---|
| 1 | room temp | 54 | 604K | 151K | 20K | 136K | 49 | 47 | 74 | 39 | 10 |
| 1 | 121° C., 10 min | 80 | 267K | 35K | 21K | 50K | 109 | 47 | 89 | 40 | 420 |
| 2 | 121° C., 10 min | 80 | 267K | 35K | 30K | 50K | 280 | 160 | 130 | 81 | 107 |
| 3 | 121° C., 10 min | 79 | 257K | 45K | 21K | 80K | 316 | 175 | 160 | 70 | 70 |
| 4 | 121° C., 10 min | 79 | 257K | 45K | 31K | 80K | 433 | 228 | 211 | 88 | 55 |

1: BA/AM/IBMA 97/2.5/0.5 initiated by Wako V-50 at 60° C.
2: Same as (1) with 15 wt. % tackifier.
3: Control, BA/AA 97.5/2.5, Initiated by KPS it 80° C. Microgels formed during polymerization. No additional X-linking after drying.
4: Same as (3) with 15 wt. % tackifier. Only $M_w$ of polymer reported.

Unlike the emulsion blend, the single emulsion system contains gel and sol fraction within the same latex particle as a product of the polymerization process. Therefore, the gel to sol ratio could not be varied independently without affecting the molecular weight of the linear polymer. In addition, in a single emulsion system, part of the linear polymer could be entrapped inside the microgels during polymerization because of the broad polydispersity effect early in the reaction. A higher molecular weight fraction would be more prone to be attacked by the propagating polymer radicals, resulting in branching and crosslinking with the lower molecular weight fraction entrapped inside the microgels. It would be expected that the single emulsion system would have lower peel and loop tack compared to those of the emulsion blend due to lower sol fraction that is located outside the microgels.

In neat acrylic PSAs, the emulsion blend shows higher peel and loop tack compared to those of the single emulsion system while retaining high shear as shown in Table 8. Furthermore, the emulsion blend shows higher peel, loop tack and shear compared to those of solvent borne acrylic PSA.

In tackified acrylic PSAs however, the emulsion blend shows significant drop in shear compared to the neat PSA and the decrease is more pronounced than that of the single emulsion system. Although not wishing to be bound by theory, the reason for this could be explained from the competitive processes between diffusion of the linear polymer into the tackifier molecules vs. diffusion of the linear polymer into the microgels. The thermodynamic driving force would be expected to favor the former process since the tackifier is a small molecule. Hence, the linear polymer-tackifier mixture which has higher Tg would be too slow to diffuse into the microgels and would self-crosslink instead. Interlinking of the microgels is therefore much less probable than the formation of phantom network. In contrast, the single emulsion system already has the linear polymer entangled with the microgel to begin with and therefore tackifier presents less problem in interlinking the microgels by the linear polymer.

The emulsion blend of high gel containing latex and gel free latex yields an unexpected synergistic effect in increasing shear holding power of the PSA film provided that $M_c$ of the microgels was greater than $M_e$ of the linear polymer and $M_w$ of the linear polymer was greater than $2 \times M_e$. This unexpected synergism is a result of interlinking the microgels by the linear polymer due to the reaction of IBMA in the linear polymer and acrylic acid in the microgels when the film is heated. The reactivity of the microgels can be further increased by adding ammonium persulfate as chaser catalyst or increasing acrylic acid level, either of which results in much higher shear holding power of the emulsion blend film compared to that of the constituents.

Semi-continuous emulsion polymerization of 2EHA/AA and n-BA/AA under starved condition yield high level of microgels in the lattices. Film cast from acrylic emulsion retains the discrete network morphology. In contrast, solution polymerization of the same monomers led to gel free solution where low level of AAA solution could be post-added as a crosslinker which would form continuous network in the film. Therefore, for the same gel content, acrylic emulsion film showed much lower shear than the solvent counterpart as show n in Table 14. Incorporating small amount of IBMA as a copolymer facilitated interlinking of the microgels in emulsion cast film after heating. The shear was increased significantly and comparable to the solution cast film provided if the linear polymer had $M_w$ at least $2 \times M_e$ and the microgel had $M_c > M_e$.

Table 14 shows a summary of adhesive performance for emulsion vs. solvent borne acrylic having the same gel content. Addition of 15 wt. % tackifier reduced shear and increased peel and loop tack in both emulsion and solution acrylic PSAs. Tackifier increased $M_e$ and Tg which favor viscoelastic energy dissipation during debonding and viscous flow during bonding. Addition of tackifier decreased zero shear viscosity and simultaneously increased the sol fraction, which have the net effect of decreasing shear and increasing peel.and loop tack.

TABLE 14

Conventional emulsion vs. solvent borne acrylic PSAs

| Adhesive | L. Tack SS (N/m) | L. Tack HDPB (N/m) | 90° C. Peel SS (N/m) | 90° C. Peel HDPE (M/m) | 4.9N × 1.27 × 1.27 cm Shear (min) |
|---|---|---|---|---|---|
| 1. P(2EHA-stat-AA) 97.5/2.5. 75% gel | | | | | |
| Emulsion | 370 | 226 | 205 | 93 | 25 |
| Solvent | 221 | 184 | 105 | 58 | 761 |
| Tackified with 15% Snowtack® 920 | | | | | |
| Emulsion | 440 | 319 | 237 | 116 | 15 |
| Solvent | 491 | 300 | 211 | 98 | 250 |
| 2. P(BA-stat-AA) 97.5/2.5. 80% gel | | | | | |
| Emulsion | 328 | 181 | 175 | 67 | 70 |
| Solvent | 249 | 121 | 107 | 46 | 5000 |
| Tackified with 15% Snowtack® 920 | | | | | |
| Emulsion | 433 | 233 | 217 | 81 | 55 |
| Solvent | 368 | 253 | 228 | 123 | 386 |

The adhesive performance of selected IBMA functionalized acrylic emulsion PSAs in both neat and tackified compositions was compared against that of solvent borne acrylic PSAs as shown in Table 15. It is clear that by interconnecting the microgels chemically via IBMA reactions in the film after heating brought similar performance in tack, peel and shear between the emulsion and solvent borne. In contrast, as shown in Table 14, conventional acrylic emulsion, where the discrete microgels were only connected by entanglements, suffered from low shear holding power.

TABLE 15

Novel Emulsion vs. solvent borne acrylic PSAs

| Adhesive | L. Tack SS (N/m) | L. Tack HDPB (N/m) | 90° C. Peel SS (N/m) | 90° C. Peel HDPE (M/m) | 4.9N × 1.27 × 1.27 cm Shear (min) |
|---|---|---|---|---|---|
| 1. P(2EHA-stat-AA) 97.5/2.5. 75% gel | | | | | |
| Emulsion | 396 | 230 | 165 | 128 | 400 |
| Solvent | 221 | 184 | 105 | 58 | 761 |
| Tackified with 15% Snowtack® 920 | | | | | |
| Emulsion | 516 | 321 | 235 | 123 | 250 |
| Solvent | 491 | 300 | 210 | 98 | 250 |
| 2. P(BA-stat-AA) 97.5/2.5. 80% gel | | | | | |
| Emulsion | 211 | 91 | 119 | 84 | 1100 |
| Solvent | 249 | 121 | 107 | 46 | 5000 |
| Tackified with 15% Snowtack® 920 | | | | | |
| Emulsion | 386 | 281 | 205 | 112 | 995 |
| Solvent | 368 | 253 | 228 | 123 | 386 |

High gel containing lattices of poly(2EHA-co-AA) were blended with gel free latex of poly(2EHA-co-AA-co-IBMAco-DDM) at 100/0, 75/25, 50/50, and 25/75 weight ratios. Interlinking the microgels with the linear polymer in the film was facilitated by the IBMA-acrylic acid reaction. This was possible only if the $M_c$ of the microgels was greater than the $M_e$ of the linear polymer and the $M_w$ of the linear polymer was greater than 2×the $M_e$. Increasing the acidity of the microgels by either adding ammonium persulfate as chaser catalyst or increasing the acrylic acid level enhanced the reactivity of the microgels. This results in a synergistic effect in increasing shear of the emulsion blend film. Film cast from poly(2EHA-co-AA) 96/4 by weight blended with poly(2EHA-co-AA-co-IBMA-co-DDM) 96.9/2.5/0.5/0.1 at 75/25 weight ratio showed higher peel, loop tack and shear compared to those of solvent acrylic PSA film.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An adhesive composition, comprising:
   microgels of at least one acrylic polymer; and
   an interlinking polymer covalently bonding at least some of said microgels to each other through said interlinking polymer.

2. The composition of claim 1 wherein said composition further comprises at least one non-gelled polymer, said interlinking polymer covalently bonding at least some of said microgels to at least some of said non-gelled polymer.

3. The composition of claim 1 wherein the average molecular weight between crosslinks of said microgels is greater than the entanglement molecular weight of said interlinking polymer, and the weight average molecular weight of said interlinking polymer is greater than two times the entanglement molecular weight of said interlinking polymer.

4. The composition of claim 1 wherein said microgels have an average diameter in the range of about 50 to about 1000 nanometers.

5. The composition of claim 1 wherein the concentration of the microgels in said composition is from about 20 to about 80% by weight based on the total solids in said composition.

6. The composition of claim 1 wherein said composition has a gel to sol weight ratio of about 20:80 to about 90:10.

7. The composition of claim 1 wherein said acrylic polymer is derived from an acrylate, a methacrylate, or a mixture thereof.

8. The composition of claim 1 wherein said acrylic polymer is derived from methyl acrylate, ethyl acrylate, phenyl acrylate, butyl acrylate, 2-ethylhexyl acrylate, isobornyl acrylate, 2-hydroxy ethyl acrylate, 2-chloro ethyl methyl methacrylate, ethyl methacrylate, butyl methacrylate, 2-ethylhexyl methacrylate, phenyl methacrylate, isobornyl methacrylate, 2-hydroxyethyl methacrylate, 2-chloroethyl methacrylate, and mixtures of two or more thereof.

9. The composition of claim 1 wherein said acrylic polymer is a copolymer derived from at least one acrylate monomer and at least one comonomer selected from acrylonitriles, acrylamides, methacrylamides, vinyl esters, vinyl ethers, vinyl amides, vinyl ketones, styrenes, halogen containing monomers, ionic monomers, acid containing monomers, base containing monomers, olefins, and mixtures of two or more thereof.

10. The composition of claim 1 wherein said acrylic polymer is poly (2-ethylhexyl acrylate-co-acrylic acid), poly (n-butyl acrylate-co-acrylic acid), or a mixture thereof.

11. The composition of claim 2 wherein said non-gelled polymer is an acrylic polymer derived from an acrylate, a methacrylate, or a mixture thereof.

12. The composition of claim 2 wherein said non-gelled polymer is an acrylic polymer derived from methyl acrylate, ethyl acrylate, phenyl acrylate, butyl acrylate, 2-ethylhexyl acrylate, isobornyl acrylate, 2-hydroxy ethyl acrylate, 2-chloro ethyl methyl methacrylate, ethyl methacrylate, butyl methacrylate, 2-ethylhexyl methacrylate, phenyl methacrylate, isobornyl methacrylate, 2-hydroxyethyl methacrylate, 2-chloroethyl methacrylate, and mixtures of two or more thereof.

13. The composition of claim 2 wherein said non-gelled polymer is a copolymer derived from at least one acrylate monomer and at least one comonomer selected from acrylonitriles, acrylamides, methacrylamides, vinyl esters, vinyl ethers, vinyl amides, vinyl ketones, styrenes, halogen containing monomers, ionic monomers, acid containing monomers, base containing monomers, olefins, and mixtures of two or more thereof.

14. The composition of claim 2 wherein said non-gelled polymer is a poly (2-ethylhexyl acrylate-co-acrylic acid), poly (n-butyl acrylate-co-acrylic acid), or a mixture thereof.

15. The composition of claim 1 wherein said interlinking polymer is a difunctional compound comprising a first functional group having ethylenic unsaturation and a second functional group selected from epoxy, alkoxy, hydroxy, amino, isocyanate, oxazoline, acrylamido, or cyano.

16. The composition of claim 1, wherein said interlinking polymer is derived from butoxymethyl acrylamide, isobutoxymethyl acrylamide, isobutoxy acrylamide, methylol acrylamide, isobutoxy methyl methacrylamide, isobutoxy methacrylamide, methylol methacrylamide, or a mixture of two or more thereof.

17. The composition of claim 1 wherein said interlinking polymer is derived from isobutoxymethyl acrylamide.

18. The composition of claim 1 wherein said interlinking polymer is made by incorporating isobutoxymethyl acrylamide into poly (2-ethylhexyl acrylate-co-acrylic acid), poly (n-butyl acrylate-co-acrylic acid), or a mixture thereof.

19. The composition of claim 1 further comprising a tackifier.

20. The composition of claim 1 wherein said composition is a pressure sensitive adhesive composition.

21. An aqueous dispersion, comprising:
    water;
    microgels of at least one acrylic polymer dispersed in said water; and
    at least one interlinking polymer capable of covalently bonding said microgels to each other through said interlinking polymer.

22. The dispersion of claim 21 wherein said dispersion further comprises at least one non-gelled polymer and said interlinking polymer is capable of covalently bonding said microgels to said non-gelled polymer.

23. The dispersion of claim 21 wherein said acrylic polymer is derived from an acrylate, an methacrylate, or a mixture thereof.

24. The dispersion of claim 21 wherein said acrylic polymer is derived from methyl acrylate, ethyl acrylate, phenyl acrylate, butyl acrylate, 2-ethylhexyl acrylate, isobornyl acrylate, 2-hydroxy ethyl acrylate, 2-chloro ethyl methyl methacrylate, ethyl methacrylate, butyl methacrylate, 2-ethylhexyl methacrylate, phenyl methacrylate, isobornyl methacrylate, 2-hydroxyethyl methacrylate, 2-chloroethyl methacrylate, and mixtures of two or more thereof.

25. The dispersion of claim 21 wherein said acrylic polymer is a copolymer derived from at least one acrylate monomer and at least one comonomer selected from acrylonitriles, acrylamides, methacrylamides, vinyl esters, vinyl ethers, vinyl amides, vinyl ketones, styrenes, halogen containing monomers, ionic monomers, acid containing monomers, base containing monomers, olefins, and mixtures of two or more thereof.

26. The dispersion of claim 21 wherein said acrylic polymer is a poly (2-ethylhexyl acrylate-co-acrylic acid), poly (n-butyl acrylate-co-acrylic acid), or a mixture thereof.

27. The dispersion of claim 21 wherein said non-gelled polymer is derived from an alkyl acrylate, an alkyl methacrylate, or a mixture thereof.

28. The dispersion of claim 22 wherein said non-gelled polymer is derived from methyl acrylate, ethyl acrylate, phenyl acrylate, butyl acrylate, 2-ethylhexyl acrylate, isobornyl acrylate, 2-hydroxy ethyl acrylate, 2-chloro ethyl methyl methacrylate, ethyl methacrylate, butyl methacrylate, 2-ethylhexyl methacrylate, phenyl methacrylate, isobornyl methacrylate, 2-hydroxyethyl methacrylate, 2-chloroethyl methacrylate, and mixtures of two or more thereof.

29. The dispersion of claim 22 wherein said non-gelled polymer is a copolymer derived from at least one acrylate monomer and at least one comonomer selected from acrylonitriles, acrylamides, methacrylamides, vinyl esters, vinyl ethers, vinyl amides, vinyl ketones, styrenes, halogen containing monomers, ionic monomers, acid containing monomers, base containing monomers, olefins, and mixtures of two or more thereof.

30. The dispersion of claim 22 wherein said non-gelled polymer is a poly (2-ethylhexyl acrylate-co-acrylic acid), poly (n-butyl acrylate-co-acrylic acid), or a mixture thereof.

31. The dispersion of claim 21 wherein said interlinking polymer is a difunctional compound comprising a first functional group having ethylenic unsaturation and a second functional group selected from epoxy, alkoxy, hydroxy, amino, isocyanate, or cyano.

32. The dispersion of claim 21, wherein said interlinking polymer is derived from isobutoxymethyl acrylamide, isobutoxy acrylamide, methylol acrylamide, isobutoxy methyl methacrylamide, isobutoxy methacrylamide, methylol methacrylamide, or a mixture of two or more thereof.

33. The dispersion of claim 21 wherein said interlinking polymer is derived from isobutoxymethyl acrylamide.

34. The dispersion of claim 21 wherein said interlinking polymer is made by incorporating isobutoxymethyl acrylamide into poly (2-ethylhexyl acrylate-co-acrylic acid), poly (n-butyl acrylate-co-acrylic acid), or a mixture thereof.

35. The dispersion of claim 21 wherein said microgels have an average diameter of about 50 to about 1000 nanometers.

36. The dispersion of claim 21, wherein said dispersion has a total solids content in the range from about 30 to about 65% by weight.

37. An adhesive composition made by heating the dispersion of claim 21 at a sufficient temperature and for an effective period of time to covalently bond at least some of said microgels with each other through said interlinking polymer.

38. The composition of claim 37 wherein said composition comprises a mixture of linked microgels and non-linked microgels.

39. The composition of claim 37 wherein the molecular weight of the crosslinks between the microgels is greater than the entanglement molecular weight of said interlinking polymer, and the weight average molecular weight of said interlinking polymer is greater than two times the entanglement molecular weight of said interlinking polymer.

40. An adhesive composition made by heating the dispersion of claim 22 at a sufficient temperature and for an effective period of time to covalently bond at least some of said microgels to said non-gelled polymer through said interlinking polymer.

41. The composition of claim 37 wherein said adhesive composition is a pressure sensitive adhesive.

42. A process for making an adhesive, comprising:
(i) forming a monomer emulsion comprising water, at least one acrylic monomer, optionally at least one comonomer, optionally a chain transfer agent, an unsaturated carboxylic acid, and an interlinking agent;
(ii) mixing a polymerization initiator with said monomer emulsion and polymerizing the resulting mixture to form an aqueous dispersion comprising microgels of at least one polymer; and
(iii) heating the dispersion formed in step (ii) at a sufficient temperature and for an effective period of time to covalently bond at least some of said microgels with each other through said interlinking agent.

43. A process for making an adhesive, comprising:
(A) forming a first aqueous dispersion comprising microgels of at least one polymer dispersed in water by
(i) forming a first monomer emulsion comprising water, at least one acrylic monomer, optionally at least one comonomer, optionally a chain transfer agent, and an unsaturated carboxylic acid; and
(ii) mixing a polymerization initiator with said first monomer emulsion and polymerizing the resulting mixture to form said first aqueous dispersion;
(B) forming a second aqueous dispersion comprising a non-gelled polymer by
(i) forming a second monomer emulsion comprising water, at least one acrylic monomer, optionally at least one comonomer, optionally a chain transfer agent, an unsaturated carboxylic acid, and an interlinking agent;
(ii) mixing a polymerization initiator with said second monomer emulsion and polymerizing the resulting mixture to form said second aqueous dispersion;
(C) combining the first and second aqueous dispersions to form a combined aqueous dispersion; and
(D) heating the combined aqueous dispersion at a sufficient temperature and for an effective period of time to covalently bond at least some of said microgels to at least some of said non-gelled polymer.

* * * * *